United States Patent
Matsen et al.

(10) Patent No.: US 9,662,742 B2
(45) Date of Patent: May 30, 2017

(54) METALLIC BLADDERS

(71) Applicant: The Boeing Company, Chicago, IL (US)

(72) Inventors: Marc Rollo Matsen, Seattle, WA (US); Alexander M. Rubin, St. Louis, MO (US); Randall Dow Wilkerson, O'Fallon, MO (US); Carey E. Wilkinson, Summerville, SC (US); James Rodney Fox, University City, MO (US); Charles R. Prebil, University City, MO (US); Gregory James Schoepen Hickman, University City, MO (US); Jeffery Lee Marcoe, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 125 days.

(21) Appl. No.: 14/324,750

(22) Filed: Jul. 7, 2014

(65) Prior Publication Data
US 2015/0013894 A1 Jan. 15, 2015

Related U.S. Application Data

(63) Continuation-in-part of application No. 13/937,253, filed on Jul. 9, 2013.

(51) Int. Cl.
B32B 38/00 (2006.01)
B23K 20/12 (2006.01)
(Continued)

(52) U.S. Cl.
CPC .......... B23K 20/129 (2013.01); B21D 26/033 (2013.01); B23K 20/12 (2013.01);
(Continued)

(58) Field of Classification Search
CPC .. B23K 20/12; B23K 20/2336; B23K 20/129; B23K 20/1255; B29C 35/0805;
(Continued)

(56) References Cited

U.S. PATENT DOCUMENTS 2,940,126 A 6/1960 Sheridan
4,056,596 A 11/1977 Pahl
(Continued)

FOREIGN PATENT DOCUMENTS

EP 0400599 A2 12/1990
EP 2508329 A1 10/2012
(Continued)

OTHER PUBLICATIONS

Office Action, dated Sep. 23, 2015, regarding U.S. Appl. No. 13/937,285, 29 pages.
(Continued)

*Primary Examiner* — Daniel McNally
(74) *Attorney, Agent, or Firm* — Yee & Associates, P.C.

(57) ABSTRACT

A method and apparatus is presented. A method may comprise positioning a metallic bladder within a tool, the tool having a number of die liners that generate heat when exposed to a magnetic field; applying the magnetic field to the number of die liners to heat the metallic bladder; and pressurizing the metallic bladder.

16 Claims, 19 Drawing Sheets

(51) Int. Cl.
| | | |
|---|---|---|
| *B23K 20/233* | (2006.01) | |
| *B21D 26/033* | (2011.01) | |
| *B29C 33/06* | (2006.01) | |
| *B29C 33/50* | (2006.01) | |
| *B29C 70/44* | (2006.01) | |
| *B29D 99/00* | (2010.01) | |
| *B29C 35/02* | (2006.01) | |
| *B23K 101/18* | (2006.01) | |
| *B23K 101/28* | (2006.01) | |
| *B23K 103/10* | (2006.01) | |
| *B29C 35/08* | (2006.01) | |

(52) U.S. Cl.
CPC ...... *B23K 20/1255* (2013.01); *B23K 20/2336* (2013.01); *B29C 33/06* (2013.01); *B29C 33/505* (2013.01); *B29C 35/0272* (2013.01); *B29C 35/0805* (2013.01); *B29C 70/446* (2013.01); *B29D 99/0007* (2013.01); *B23K 2201/18* (2013.01); *B23K 2201/28* (2013.01); *B23K 2203/10* (2013.01); *B29C 2035/0811* (2013.01); *B29K 2905/00* (2013.01)

(58) Field of Classification Search
CPC . B29C 35/0272; B29C 33/106; B29C 33/505; B29C 70/446; B29D 99/007; B21D 26/033
See application file for complete search history.

(56) References Cited

U.S. PATENT DOCUMENTS

| | | | |
|---|---|---|---|
| 4,946,526 A | 8/1990 | Petty-Galis et al. | |
| 5,019,057 A | 5/1991 | Truckai | |
| 5,587,098 A | 12/1996 | Matsen et al. | |
| 5,591,370 A | 1/1997 | Matsen et al. | |
| 5,624,594 A | 4/1997 | Matsen et al. | |
| 5,645,744 A | 7/1997 | Matsen et al. | |
| 5,683,608 A | 11/1997 | Matsen et al. | |
| 5,710,414 A | 1/1998 | Matsen et al. | |
| 5,728,309 A | 3/1998 | Matsen et al. | |
| 5,772,681 A | 6/1998 | Leoni et al. | |
| 6,039,832 A * | 3/2000 | McCarville | B32B 3/12 156/292 |
| 6,156,254 A | 12/2000 | Andrews et al. | |
| 6,180,932 B1 | 1/2001 | Matsen et al. | |
| 6,528,771 B1 | 3/2003 | Matsen et al. | |
| 6,747,253 B1 * | 6/2004 | Firth | H05B 6/105 219/634 |
| 2002/0011509 A1 * | 1/2002 | Nelson | B23K 20/122 228/112.1 |
| 2003/0102070 A1 | 6/2003 | Black et al. | |
| 2004/0082965 A1 | 4/2004 | Beckham | |
| 2004/0104512 A1 | 6/2004 | Eidenschink | |
| 2005/0035115 A1 * | 2/2005 | Anderson | B29C 33/04 219/759 |
| 2005/0258575 A1 | 11/2005 | Kruse et al. | |
| 2006/0289112 A1 | 12/2006 | Holman et al. | |
| 2008/0302486 A1 | 12/2008 | Jones et al. | |
| 2010/0170613 A1 | 7/2010 | Kendall et al. | |
| 2010/0269326 A1 | 10/2010 | Allehaux et al. | |
| 2012/0228467 A1 | 9/2012 | Wallen et al. | |
| 2013/0075529 A1 | 3/2013 | Marcoe | |
| 2013/0082047 A1 | 4/2013 | Matsen et al. | |

FOREIGN PATENT DOCUMENTS

| | | |
|---|---|---|
| JP | H026107 A | 1/1990 |
| JP | 2011098514 A | 5/2011 |

OTHER PUBLICATIONS

Final Office Action, dated Nov. 13, 2015, regarding U.S. Appl. No. 13/937,269, 19 pages.
Final Office Action, dated Oct. 9, 2015, regarding U.S. Appl. No. 13/937,253, 21 pages.
Office Action, dated Jun. 25, 2015, regarding U.S. Appl. No. 13/937,269, 25 pages.
International Search Report and Written Opinion, dated Jan. 30, 2015, regarding Application No. PCT/US2014/045712, 18 pages.
Office Action, dated Apr. 15, 2015, regarding U.S. Appl. No. 13/937,253, 23 pages.
International Search Report and Written Opinion, dated Sep. 2, 2014, regarding Application No. PCT/US2014/042495, 7 pages.
International Search Report and Written Opinion, dated Oct. 16, 2014, regarding Application No. PCT/US2014/042467, 11 pages.
Matsen et al., "Thermoplastic Sandwich Structures," U.S. Appl. No. 13/937,269, filed Jul. 9, 2013, 65 pages.
Matsen et al., "Thermoplastic and Titanium Sandwich Structures," U.S. Appl. No. 13/937,285, filed Jul. 9, 2013, 50 pages.
Matsen et al., "Thermoplastic Structures," U.S. Appl. No. 13/937,253, filed Jul. 9, 2013, 50 pages.
Final Office Action, dated Feb. 11, 2016, regarding U.S. Appl. No. 13/937,285, 30 pages.
Notice of Allowance, dated Feb. 5, 2016, regarding U.S. Appl. No. 13/937,269, 14 pages.
Notice of Allowance, dated Jun. 13, 2016, regarding U.S. Appl. No. 13/937,285, 15 pages.

* cited by examiner

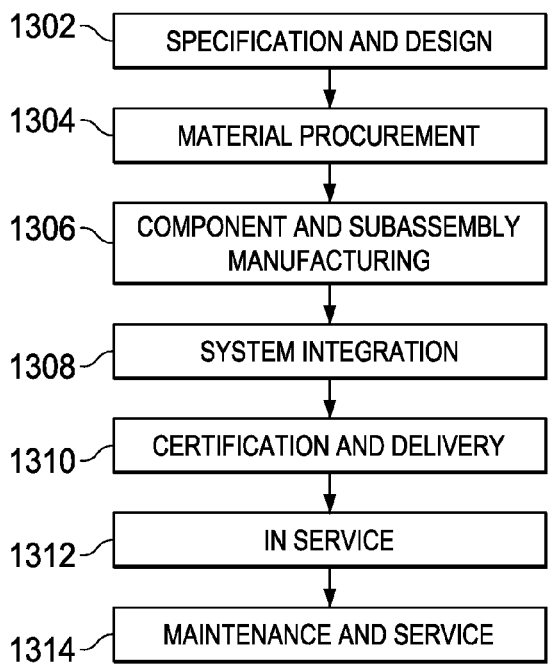
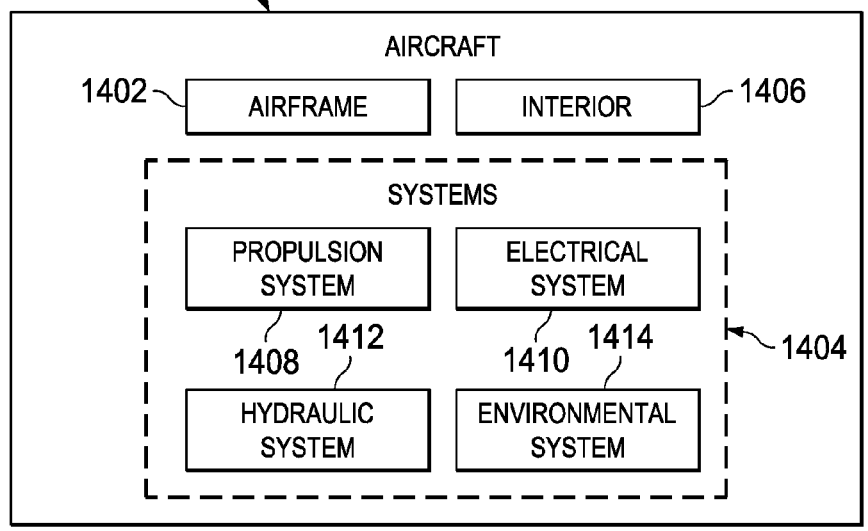

METALLIC BLADDERS

CROSS-REFERENCE TO RELATED APPLICATIONS

This application is a Continuation-in-Part application of U.S. patent application Ser. No. 13/937,253, filed on Jul. 9, 2013, entitled "Thermoplastic Structures," which is incorporated herein by reference. U.S. patent application Ser. No. 13/937,253 is related to the following patent applications: U.S. patent application Ser. No. 13/937,269, filed Jul. 9, 2013, entitled "Thermoplastic Sandwich Structures," and U.S. patent application Ser. No. 13/937,285, filed Jul. 9, 2013, entitled "Thermoplastic and Titanium Sandwich Structures," which are incorporated herein by reference.

BACKGROUND INFORMATION

1. Field

The present disclosure relates generally to the formation of composite structures and the formation of metallic bladders. More particularly, the present disclosure relates to thermoplastic composite structures. Yet more particularly, the present disclosure relates to a method and apparatus for forming a metallic bladder. Further, the present disclosure relates to a method and apparatus for consolidating a structure comprising a thermoplastic material.

2. Background

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Currently, composite structures may be created using thermoset materials. However, the time required to create a structure from thermoset materials may be undesirable.

For example, the speed of placing thermoset composite materials may be limited. Further, curing a thermoset material may require several hours. In addition to holding the thermoset material at a curing temperature for several hours, conventional autoclaves using resistive heating to cure thermoset materials may further require several hours for heating up and cooling down.

Consolidating a thermoplastic material may take significantly less time than curing a thermoset material. However, the time for resistive heating during consolidation of thermoplastic material may still be undesirable.

Further, stamp forming of thermoplastic material may currently be used to form non-planar thermoplastic structures. Alternative methods to traditional stamp forming of thermoplastic material may be required to produce thermoplastic structures having non-planar structures, including structures having closed cross-sections. An alternative method of producing a thermoplastic structure may provide improved processing of ply drops, ply additions, and other features of the thermoplastic structure. Improved processing may include improve quality of the resulting thermoplastic structure.

Yet further, consolidation of thermoplastic materials may cause loss of definition of the thermoplastic material. Loss of definition may include loss or rounding of features of the thermoplastic material. Specifically, tooling for consolidation may include round features of the thermoplastic material. Features may include ply drop-offs, ply additions, ramp ups, ramp downs, or other changes in the number or locations of plies causing varying composite material thickness. Consolidation of a thermoplastic material with features causing varying composite thickness may cause rounding of these features.

Still further, reusable tooling for consolidation of thermoplastic materials may be desired. Tooling may have substantially the same shape as the thermoplastic material to be consolidated. Further, it may be desirable to increase the longevity of tooling for consolidation.

Accordingly, there is a need for a method and assembly for forming non-planar thermoplastic structures. Specifically, there is a need for a method and assembly for consolidating thermoplastic structures having closed cross-sections. Further, there is a need to consolidate the thermoplastic sandwich structures faster than using resistive heating. Yet further, there is a need to consolidate thermoplastic structures without loss of definition of features. Still further, there is a need for forming tooling for consolidation of thermoplastic structures and maintaining or increasing the longevity of the tooling. Therefore, it would be desirable to have a method and apparatus that take into account at least some of the issues discussed above, as well as other possible issues.

SUMMARY

In an illustrative embodiment, a method of forming a metallic bladder is provided. The method comprises positioning the metallic bladder within a tool, the tool having a number of die liners that generate heat when exposed to a magnetic field; applying the magnetic field to the number of die liners to heat the metallic bladder; and pressurizing the metallic bladder.

In another illustrative embodiment, a method of forming a consolidated structure is provided. The method comprises positioning a thermoplastic material and a metallic bladder within a tool, the thermoplastic material and the metallic bladder forming a preform structure, and the tool having a number of die liners that generate heat when exposed to a magnetic field. The method further comprises applying the magnetic field to the number of die liners to heat the preform structure and increasing a pressure in the metallic bladder to a first level when the preform structure reaches a first temperature.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of an aircraft manufacturing and service method in the form of a block diagram in accordance with an illustrative embodiment; and FIG. 14 is an illustration of an aircraft in the form of a block diagram in which an illustrative embodiment may be implemented;

DETAILED DESCRIPTION

Figure 1:
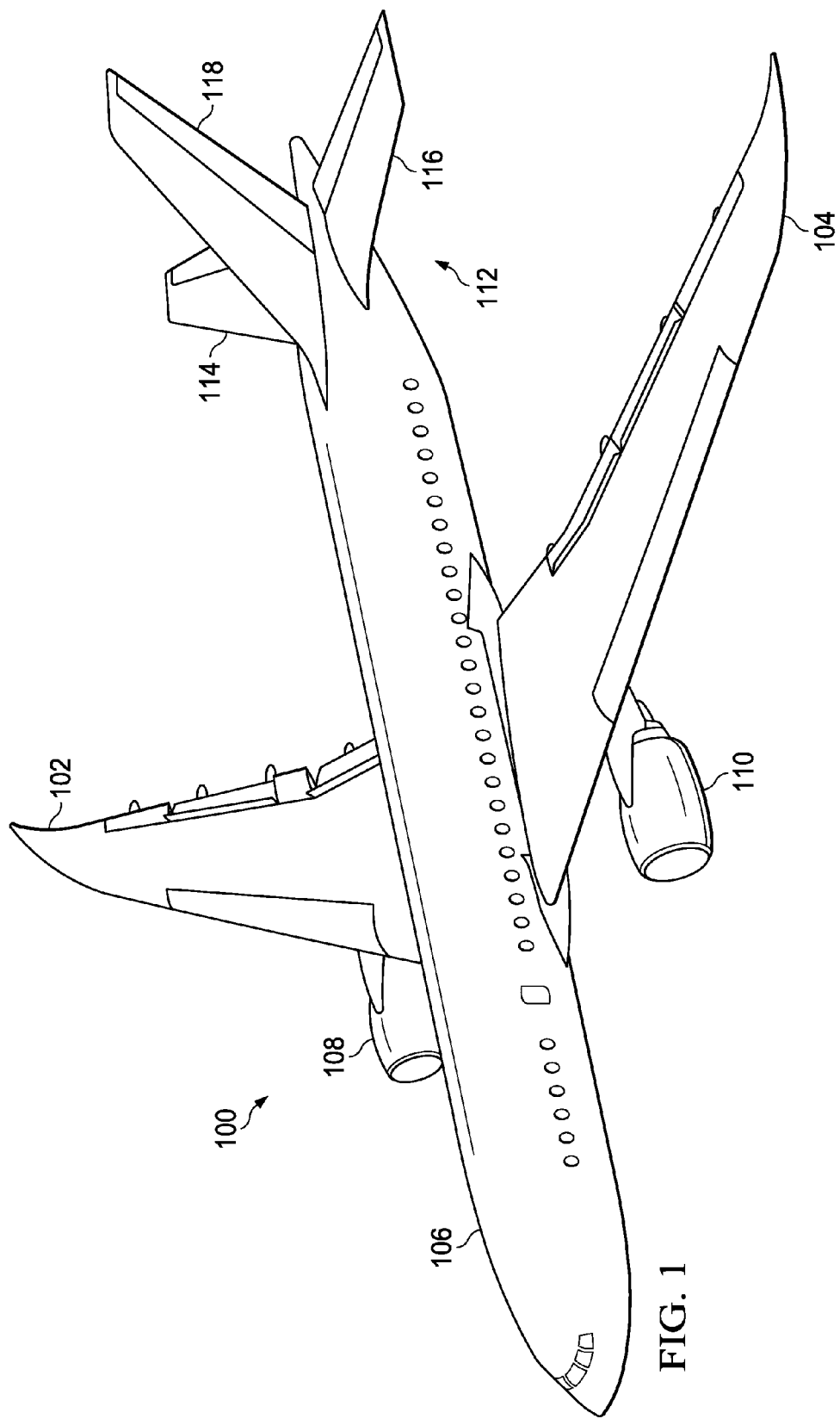
FIG. 1 is an illustration of an aircraft in accordance with an illustrative embodiment.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

The different illustrative embodiments recognize and take into account a number of different considerations. For example, the illustrative embodiments recognize and take into account that currently, composite structures may be created using thermoset materials. The illustrative embodiments recognize and take into account that the time required to create a structure from thermoset materials may be undesirable.

For example, thermoset materials may be laid up by hand or by machine to form the shape of the structure. The illustrative embodiments recognize and take into account that the speed of placing composite material may be limited.

Further, the illustrative embodiments recognize and take into account that curing a thermoset material may require several hours. In addition to holding the thermoset material at a curing temperature for several hours, conventional autoclaves using resistive heating to cure thermoset materials may further require several hours for heating up and cooling down.

The different illustrative embodiments recognize and take into account that consolidating a thermoplastic material may take significantly less time than curing a thermoset material. Further, the different illustrative embodiments recognize and take into account that using inductive heating may reduce the time required to consolidate a thermoplastic material or cure a thermoset material. Yet further, the different illustrative embodiments recognize and take into account that using inductive heating may reduce the energy consumed to consolidate a thermoplastic material or cure a thermoset material.

The different illustrative embodiments recognize and take into account that currently, stamp forming of thermoplastic material may be used to form non-planar thermoplastic structures. However, the different illustrative embodiments recognize and take into account that forming a non-planar thermoplastic structure using an alternative method may produce more desirable physical properties in the thermoplastic material of the thermoplastic structure. The illustrative embodiments further recognize and take into account that an alternative method may be required to produce thermoplastic structures having closed cross-sections.

Further, the different illustrative embodiments recognize and take into account that producing a thermoplastic structure using an alternative method may reduce the time required to produce the thermoplastic structure. Yet further, the different illustrative embodiments recognize and take into account that an alternative method of producing a thermoplastic structure may provide improved processing of ply drops, ply additions, and other features of the thermoplastic structure.

In manufacturing composite structures, layers of composite material are typically laid up on a tool. The layers may be comprised of fibers in plies. These plies may take the form of fabrics, tape, tows, or other suitable forms. In some cases, resin may be infused or preimpregnated into the plies. These types of plies are commonly referred to as prepreg.

The different layers of prepreg may be laid up in different orientations and different numbers of layers may be used depending on the thickness of the composite structure being manufactured. Different orientations of layers may be used depending on at least one of the expected use and expected load of the composite structure being manufactured. These layers may be laid up by hand or by using automated equipment such as a fiber placement system. After the layers of composite material have been laid up on the tool, the layers of composite material may be consolidated or cured upon exposure to temperature and pressure, thus forming the final composite structure.

The different illustrative embodiments also recognize and take into account that braided composites may provide improved properties over stacked layers of composite tape or tows. For example, the illustrative embodiments recognize and take into account that braided composites may provide improved out of plane loading. Braided composites may comprise fibers which cross over each other, improving the out of plane loading over stacked composite layers. As used herein, "out of plane loads" refer to loads which are not in the plane of the object. For example, loads perpendicular to the surface of a braided composite are out of plane loads. Improved out of plane loading may result in improved damage tolerance. As used herein, "improved damage tolerance" means improved resistance to damage resulting from impact or other sources.

The different illustrative embodiments also recognize and take into account that using braided composites may reduce composite manufacturing time. For example, the different illustrative embodiments recognize and take into account that braiding equipment may utilize a larger number of spools of composite material at once than conventional composite placement equipment. Accordingly, the different illustrative embodiments recognize that using braiding equipment may reduce manufacturing time.

The different illustrative embodiments also recognize and take into account that metallic bladders may be created from constant cross section tubing or from sheet material. These metallic bladders may have an initial shape. To consolidate thermoplastic materials, it may be desirable to have metallic bladders having a first shape substantially similar to a shape of the structure to be consolidated.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thermoplastic structures may be implemented in accordance with an illustrative embodiment. In one illustrative example, a structural support such as a spar, rib, or other structural support of wing 104 may comprise a thermoplastic structure.

In another illustrative embodiment, a structural support of body 106 may comprise a thermoplastic structure.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
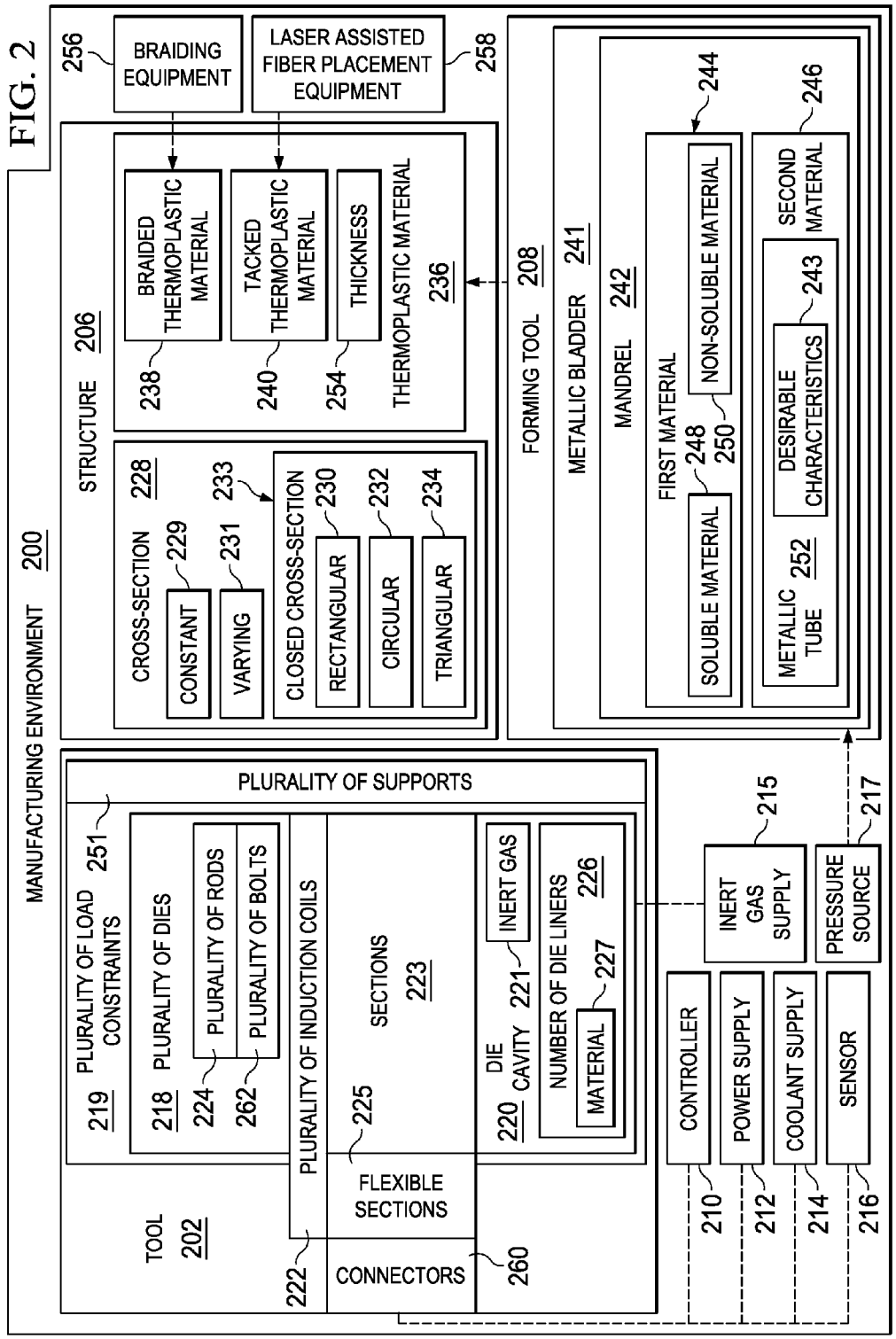
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 in FIG. 2 is depicted in a block form to illustrate different components for one or more illustrative embodiments. In this depicted example, manufacturing environment 200 includes tool 202, structure 206, forming tool 208, controller 210, power supply 212, coolant supply 214, sensor 216, braiding equipment 256, and laser assisted fiber placement equipment 258.

Tool 202 is configured to consolidate structure 206. As used herein, consolidation comprises applying elevated temperature, elevated pressure, or elevated temperature and pressure to a thermoplastic material such that the resin in thermoplastic material flows. As the resin in the thermoplastic material flows together the reinforcing fibers may stay in substantially the same orientation. As the resin flows it may mingle with the resin of nearby thermoplastic materials at the boundaries of the nearby thermoplastic materials. The resin solidifies upon cooling. Consolidation may result in composite materials with a higher quality. Consolidation may result in composite materials with a lower void content. Tool 202 comprises plurality of load constraints 219 supported by plurality of supports 251. Tool 202 also comprises plurality of dies 218 located within plurality of load constraints 219. Die cavity 220 may be a space created by plurality of dies 218. Die cavity 220 may be configured to contain structure 206 during a consolidation process.

Plurality of dies 218 may be formed of a material which is not susceptible to inductive heating. In some illustrative examples, plurality of dies 218 may be formed from a ceramic, a composite, a phenolic, or some other desirable material. In one illustrative example, the material for plurality of dies 218 may be selected based on a coefficient of thermal expansion, thermal shock resistance, and compression strength. In this illustrative example, the material may be selected to have a low coefficient of thermal expansion, desirable thermal shock resistance, and relatively high compression strength. In one illustrative example, plurality of dies 218 may be a castable fused silica ceramic. In another illustrative example, plurality of dies 218 may be formed of a laminated metal. A laminated metal may be formed of multiple layers of metal with dielectric material between at least some of the layers of the metal. In some examples, the dielectric material may be air. Each metal layer may have a thickness of from about 1/16" to about 1/2". It may be desirable for each metal layer to have a thickness between about 1/8" and about 1/3". In these examples, the metal layers may be attached to each other using clamps, fasteners, and/or any other suitable technique. The metal layers may be oriented in a generally perpendicular relationship with respect to the forming surfaces of plurality of dies 218. In these illustrative examples, the laminated metal is inert to the magnetic field created by plurality of induction coils 222 embedded in plurality of dies 218. For example, the laminated metal may be a non-magnetic stainless steel.

When plurality of dies 218 is a laminated metal, plurality of dies 218 may undergo faster thermal cycles due to at least one of the metal material or the layout of plurality of induction coils 222 and cooling medium within plurality of dies 218. Specifically, in some illustrative examples, cooling medium may be applied directly to the backside of number of die liners 226 by applying cooling medium through spaces between the metal layers. Further, faster heat up rates may be accomplished due to significant induced current cancellation. Faster heat up and cool down rates may increase the rate of fabrication, thus increasing the number of parts which can be formed in tool 202 during a period of time.

As depicted, plurality of dies 218 contain plurality of induction coils 222 and plurality of rods 224. Plurality of induction coils 222 have sections 223 and flexible sections 225. Sections 223 of plurality of induction coils 222 may be embedded in plurality of dies 218. In some illustrative examples, sections 223 may extend along the length of each die of plurality of dies 218. Flexible sections 225 of plurality of induction coils 222 may join sections 223 of different dies in plurality of dies 218. In one illustrative example, flexible sections 225 may have adequate flexibility to move as plurality of dies 218 move. In one illustrative example, flexible sections 225 may have adequate flexibility to move to connect sections 223. Plurality of induction coils 222 may be connected to controller 210, power supply 212, coolant supply 214, and sensor 216 through connectors 260 attached to flexible sections 225.

Controller 210 may be configured to control the input power fed to plurality of induction coils 222 by power supply 212. By controlling the input power, controller 210 may control the magnetic field produced by plurality of induction coils 222. By controlling the magnetic field produced by plurality of induction coils 222, controller 210 may control the operating temperature of tool 202.

Controller 210 may be implemented in software, hardware, firmware or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Coolant supply 214 may be configured to supply coolant to plurality of induction coils 222. Coolant flowing through plurality of induction coils 222 may function as a heat exchanger to transfer heat out of tool 202. Sensor 216 may be configured to measure a temperature of a portion of tool 202 during operation.

Plurality of rods 224 may be embedded within plurality of dies 218. Plurality of rods 224 may provide reinforcement for plurality of dies 218. In one illustrative example, plurality of rods 224 is formed from fiberglass. Plurality of rods 224 may be held in place by a plurality of bolts 262. In some illustrative examples, plurality of rods 224 may extend longitudinally through a die in plurality of dies 218. In some illustrative examples, plurality of rods 224 may extend transversely through a die in plurality of dies 218. In some illustrative examples, plurality of rods 224 may extend both longitudinally and transversely through a die in plurality of dies 218.

Die cavity 220 is associated with inert gas supply 215. During consolidation of structure 206, inert gas 221 may be present in die cavity 220 from inert gas supply 215. In some illustrative examples, inert gas supply 215 may supply inert gas to pressurize metallic bladder 241.

Number of die liners 226 is positioned within die cavity 220. As depicted, number of die liners 226 comprises material 227. Material 227 may be a material configured to generate heat when exposed to a magnetic field. Material 227 may be selected from a metal, a metal alloy, a ceramic, a metalized film, or any other suitable material. In some illustrative examples, number of die liners 226 comprises a metallic alloy having ferromagnetic properties. As used herein, a number of when used with reference to items means one or more items. For example, number of die liners 226 may be one or more die liners. In some illustrative examples, a ferromagnetic material for number of die liners 226 may be selected based on a desired consolidation temperature. For example, the material for number of die liners 226 may be selected based on a temperature at which a ferromagnetic material becomes non-magnetic. This temperature is also known as a Curie temperature. A ferromagnetic material may be selected for number of die liners 226 such that the Curie temperature for the ferromagnetic material corresponds to a desired consolidation temperature. In these illustrative examples, number of die liners 226 may also be referred to as a number of smart susceptors.

Number of die liners 226 may generate heat when exposed to a magnetic field generated by plurality of induction coils 222. Number of die liners 226 may be used to apply heat to structure 206 during a consolidation process.

Structure 206 has cross-section 228. Cross-section 228 may be constant 229 or varying 231. When cross-section 228 is constant 229, cross-section 228 is the same or substantially the same throughout structure 206. When cross-section 228 is varying 231, at least one characteristic of cross-section 228 changes in at least a portion of structure 206. When cross-section 228 is varying 231, cross-section 228 may change in height, width, shape, or other characteristic. In some illustrative examples, cross-section 228 may be non-planar.

In some illustrative examples, cross-section 228 may be closed cross-section 233. As used herein, a closed cross-section is one for which a structure forms a closed path. Accordingly, structure 206 has closed cross-section 233 when cross-section 228 of structure 206 forms a closed path. Closed cross-section 233 may be rectangular 230, circular 232, or triangular 234.

Following consolidation, structure 206 may be cut to form a plurality of products. Each of the plurality of products may have a cross-section comprising a portion of cross-section 228. In one illustrative example, structure 206 may be cut along a centerline to form two structural supports each having a substantially C-shaped cross-section.

Structure 206 comprises thermoplastic material 236. As used herein, structure 206 may also be referred to as a composite structure. In some illustrative examples, structure 206 may have a non-planar cross-section and may be referred to as a non-planar composite structure. Thermoplastic material 236 may include at least one of braided thermoplastic material 238, tacked thermoplastic material 240, or any other suitable thermoplastic material. Thermoplastic material 236 has thickness 254. Thickness 254 may be constant or varying throughout structure 206. For example, thermoplastic material 236 may have ply drops or ply additions which cause thickness 254 to vary. In some illustrative examples, tacked thermoplastic material 240 may be placed onto braided thermoplastic material 238 in select locations causing thickness 254 to vary through structure 206. In some illustrative examples, thermoplastic material 236 may only comprise braided thermoplastic material 238 which causes thickness 254 to be constant.

Forming tool 208 may take the form of at least one of metallic bladder 241, mandrel 242, or any other suitable forming tool. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

In some illustrative examples, forming tool 208 takes the form of metallic bladder 241. Metallic bladder 241 may be associated with thermoplastic material 236. In some illustrative examples, metallic bladder 241 may be placed within thermoplastic material 236. In some illustrative examples, thermoplastic material 236 may be placed onto metallic bladder 241. Thermoplastic material 236 may be placed onto metallic bladder 241 using a variety of composite layup techniques. Thermoplastic material 236 may be placed onto metallic bladder 241 using at least one of braiding, tape layup, tow layup, or any other desirable composite layup process. In one illustrative example, braided thermoplastic material 238 may be placed onto metallic bladder 241 using braiding equipment 256. In one illustrative example, tacked thermoplastic material 240 may be placed onto metallic bladder 241 or onto braided thermoplastic material 238 already on metallic bladder 241 using laser assisted fiber placement equipment 258.

Metallic bladder 241 may be formed from a material exhibiting desirable characteristics 243. Desirable characteristics 243 for metallic bladder 241 may include an ability to hold pressure, thermal stability, flexibility, conformity, and thermal expansion characteristics. For example, it may be desirable for material of metallic bladder 241 to be thermally stable at consolidation temperatures for structure 206. During consolidation, metallic bladder 241 may be pressurized such that metallic bladder 241 imparts a compressive force. When thermoplastic material 236 is braided thermoplastic material 238, slits of braided thermoplastic material 238 may move relative to each other. This movement of braided thermoplastic material 238 may occur when metallic bladder 241 expands under pressure. Movement of braided thermoplastic material 238 may improve the quality of resulting structure 206.

Additionally, it may be desirable for material of metallic bladder 241 to be flexible to provide an even distribution of pressure. Further, it may be desirable for material of metallic bladder 241 to be conformable in order to conform to ply drops or other features of structure 206. Yet further, it may be desirable for material of metallic bladder 241 to have thermal expansion characteristics to allow for removal of metallic bladder 241 following consolidation.

In some illustrative examples, metallic bladder 241 may be formed of aluminum or an aluminum alloy. In some illustrative examples, metallic bladder 241 may be formed of magnesium or a magnesium alloy. In other illustrative examples, other metallic materials than aluminum or magnesium may provide desirable characteristics 243 such as an ability to hold pressure, thermal stability, flexibility, conformity, and thermal expansion characteristics.

Metallic bladder 241 is associated with pressure source 217. Pressure source 217 is configured to pressurize metallic bladder 241 during consolidation of structure 206 in tool 202.

In some illustrative examples, forming tool 208 may take the form of mandrel 242. Mandrel 242 may comprise first material 244 and second material 246. In some illustrative examples, second material 246 may be optional. In these illustrative examples, mandrel 242 may only comprise first material 244. In some illustrative examples, mandrel 242 may comprise both first material 244 and second material 246. First material 244 may comprise non-soluble material 250 or soluble material 248. In one illustrative example, soluble material 248 may be soluble in water. In this illustrative example, soluble material 248 may be selected from at least one of a ceramic, a graphite, or other suitable material which is soluble in water. Non-soluble material 250 may comprise a metal, an alloy, or other suitable material. In one illustrative example, non-soluble material 250 may comprise aluminum. In some illustrative examples, first material 244 of mandrel 242 may have a solid cross-section. In some illustrative examples, first material 244 of mandrel 242 may have a hollow cross-section.

Second material 246 is a material configured to generate heat in response to a magnetic field. In some illustrative examples, second material 246 comprises a metallic alloy having ferromagnetic properties. In some illustrative examples, a ferromagnetic material for second material 246 may be selected based on at least one of a desired consolidation temperature and the Curie temperature of number of die liners 226. For example, the material for second material 246 may be selected based on a temperature at which number of die liners 226 becomes non-magnetic. A ferromagnetic material may be selected for second material 246 such that second material 246 generates heat after number of die liners 226 becomes non-magnetic. In these illustrative examples, second material 246 may also be referred to as a plurality of smart susceptors. Second material 246 may be selected from alloy 510, Invar, Kovar, Moly Permalloy, or any other suitable material that generates heat when exposed to a magnetic field. Alloy 510 may also be known as Phosphor Bronze.

In some illustrative examples, second material 246 may be embedded within first material 244 in mandrel 242. In one illustrative example, second material 246 may take the form of metallic tube 252 within first material 244.

In some illustrative examples, forming tool 208 may take the form of mandrel 242 and metallic bladder 241. In these illustrative examples, metallic bladder 241 may substantially surround mandrel 242. In other words, metallic bladder 241 may be between mandrel 242 and structure 206. In these illustrative examples, mandrel 242 may provide rigidity to forming tool 208. During consolidation, metallic bladder 241 may provide pressure to structure 206 from forming tool 208.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of rods 224 may instead be formed of a material other than fiberglass. In this example, a plurality of reinforcing rods may be formed of a material which is preferably not electrically conductive. In another example, the plurality of reinforcing rods may be formed of an electrically conductive material and arranged such that they are not susceptible to induction heating.

As another example, instead of thermoplastic material 236, structure 206 may comprise a thermoset material. Although tool 202 is described above as performing a consolidating process, in this illustrative example, tool 202 may be used to perform a curing process of the thermoset material.

As a further example, cross-section 228 may be an open cross-section or a substantially closed cross-section. For example, cross-section 228 may be a V-shape or a U-shape.

As yet a further example, thermoplastic material 236 may be a thermoplastic material other than braided thermoplastic material 238 or tacked thermoplastic material 240. For example, thermoplastic material 236 may comprise thermoplastic composite tape which is not tacked.

Figure 3:
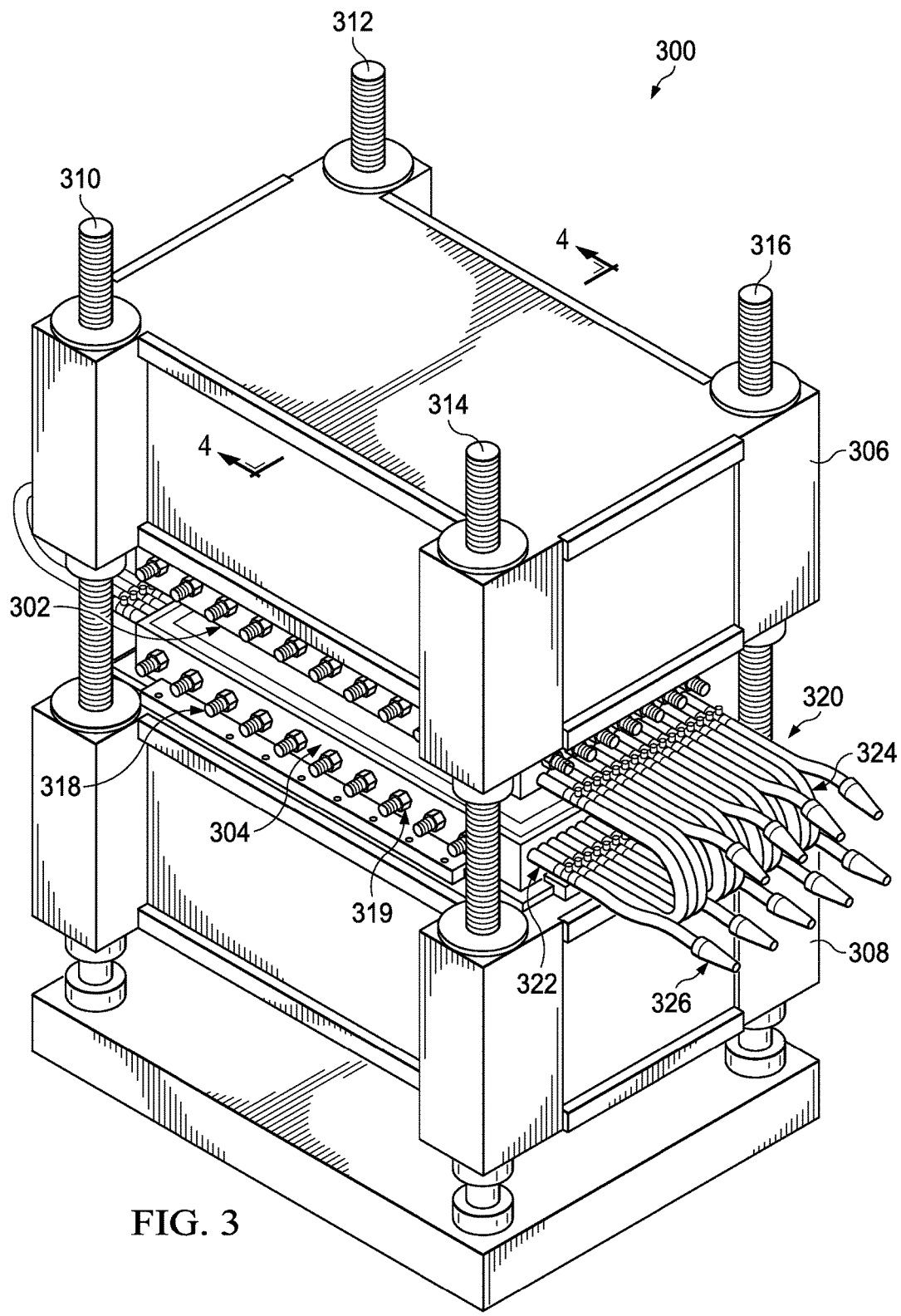
FIG. 3 is an illustration of a perspective view of a tool in accordance with an illustrative embodiment.

Turning now to FIG. 3, an illustration of a perspective view of a tool is depicted in accordance with an illustrative embodiment. In this depicted example, tool 300 is an example of a physical implementation for tool 202 and components in tool 202 in FIG. 2.

In this illustrative example, tool 300 includes first die 302 and second die 304. First die 302 and second die 304 may be a physical implementation of plurality of dies 218 of FIG. 2. As depicted, first die 302 is mounted within load constraint 306 and second die 304 is mounted within load constraint 308. Load constraint 306 and load constraint 308 may be a physical implementation of plurality of load constraints 219 of FIG. 2. First die 302 and second die 304 may be attached to load constraint 306 and load constraint 308, respectively, by any suitable fastening device such as bolting or clamping.

As depicted, load constraint 306 and load constraint 308 are mounted on column support 310, column support 312, column support 314, and column support 316. Column support 310, column support 312, column support 314, and column support 316 may be a physical implementation of plurality of supports 251 of FIG. 2. Load constraint 306 and load constraint 308 provide backing surfaces for first die 302 and second die 304. Load constraint 306 and load constraint 308 may prevent first die 302 and second die 304 from bending and cracking during manufacturing operations. Load constraint 306 and load constraint 308 may be formed from steel, aluminum, or any other desirable material. Material for load constraint 306 and load constraint 308 may be selected based on the loads present during forming or consolidation. In some illustrative examples, the material may be nonmagnetic to reduce any distortion to the magnetic field produced by plurality of induction coils 320. In some illustrative examples, load constraint 306 and load constraint 308 may not be present. In these illustrative examples, first die 302 and second die 304 may be strong enough to prevent bending or cracking.

First die 302 and second die 304 are reinforced with plurality of rods 318 that are held with plurality of bolts 319. Plurality of rods 318 may be a physical implementation of plurality of rods 224 of FIG. 2. Plurality of bolts 319 may be a physical implementation of plurality of bolts 262 of FIG. 2. Plurality of rods 318 extends both longitudinally 321 and transversely 323 in a grid through first die 302 and second die 304.

Plurality of induction coils 320 are associated with first die 302 and second die 304. Plurality of induction coils 320 may be a physical implementation of plurality of induction coils 222 of FIG. 2. Plurality of induction coils 320 comprises sections 322 and flexible sections 324. As depicted, sections 322 extend along the length of first die 302 and second die 304. Sections 322 may be embedded in first die 302 and second die 304. Sections 322 may be a physical implementation of sections 223 of FIG. 2. Flexible sections 324 join sections 322 in first die 302 and second die 304. Flexible sections 324 may be a physical implementation of flexible sections 225 of FIG. 2. Connectors 326 located at the ends of plurality of induction coils 320 may connect plurality of induction coils 320 to a controller, power source, coolant supply, or other external utility. Connectors 326 may be a physical implementation of connectors 260 of FIG. 2.

The illustration of tool 300 in FIG. 3 is not meant to imply physical or architectural limitations to the manner in which an illustrative embodiment may be implemented. Other components in addition to or in place of the ones illustrated may be used. Some components may be unnecessary.

For example, plurality of rods 318 may extend in only one direction within first die 302 and second die 304. As another example, although only first die 302 and second die 304 are depicted, tool 300 may instead have three or more dies.

Figure 4:
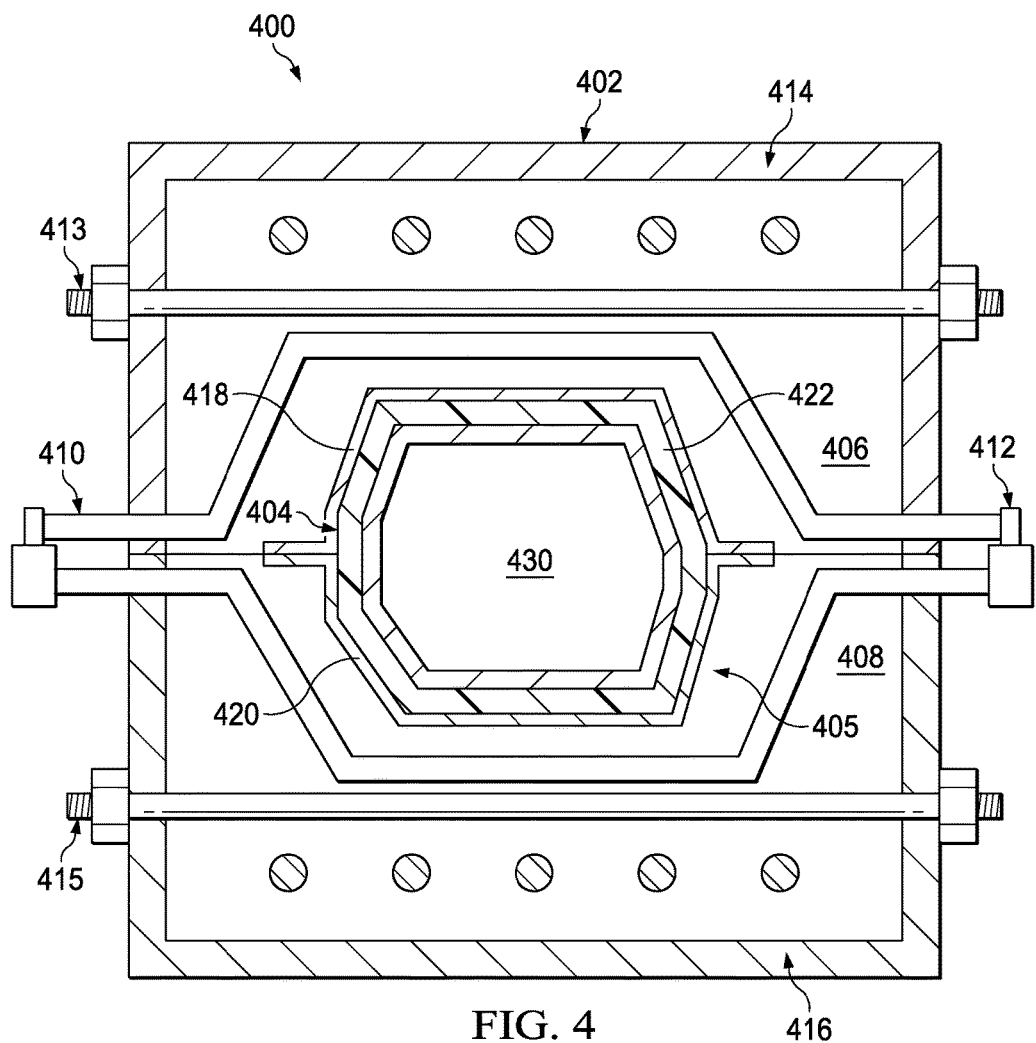
FIG. 4 is an illustration of a cross-sectional view of a structure within a tool in accordance with an illustrative embodiment.

Turning now to FIG. 4, an illustration of a cross-sectional view of a structure within a tool is depicted in accordance with an illustrative embodiment. View 400 may be a cross-sectional view of a structure within tool 300 of FIG. 3. Specifically, view 400 may be a cross-sectional view of a structure within tool 300 of FIG. 3 along lines 4-4. Tool 402 may be a physical implementation of tool 202 in FIG. 2. Structure 404 may be a physical implementation of structure 206 in FIG. 2.

As depicted, structure 404 is positioned within tool 402. Specifically, structure 404 is positioned between first die 406 and second die 408 within die cavity 405 of tool 402. Plurality of induction coils 410 runs through first die 406 and second die 408. Plurality of induction coils 410 are joined by flexible sections 412. Plurality of rods 413 runs through first die 406. Plurality of rods 415 runs through second die 408. First die 406 and second die 408 are held within load constraint 414 and load constraint 416.

Die liner 418 is associated with first die 406 within die cavity 405. Die liner 420 is associated with second die 408 in die cavity 405. Die liner 418 and die liner 420 contact structure 404 within die cavity 405.

Structure 404 comprises thermoplastic material 422. Thermoplastic material 422 may be formed using one or more composite layup processes. The one or more composite layup processes may be selected from at least one of braiding, tape layup, tow layup, or any other desirable composite layup process. In some illustrative examples, thermoplastic material 422 may be placed on metallic bladder 430 through a braiding process. Braided composite material may be laid down using braiding equipment such as braiding equipment 256 of FIG. 2. In one illustrative example, composite material may be braided directly onto metallic bladder 430 to form thermoplastic material 422.

In some illustrative examples, thermoplastic material 422 may be placed on metallic bladder 430 through a tape layup process. In one illustrative example, the tape layup process may lay composite material directly onto metallic bladder 430. In some illustrative examples, the composite layup process may be a laser assisted fiber placement process. In these illustrative examples, thermoplastic composite material may be laid down using laser assisted fiber placement equipment such as laser assisted fiber placement equipment 258 of FIG. 2. Laser assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other.

In some illustrative examples, thermoplastic material 422 may be placed on metallic bladder 430 as a preform. In this illustrative example, thermoplastic material 422 may be formed to a desired shape prior to being placed on metallic bladder 430. In some illustrative examples, thermoplastic material 422 may be consolidated or semi rigid as thermoplastic material 422 is placed on metallic bladder 430. In some illustrative examples, the preform may be created using laser assisted fiber placement equipment.

In yet other illustrative examples, thermoplastic material 422 may comprise braided thermoplastic material braided onto metallic bladder 430 and tacked thermoplastic material placed onto the braided thermoplastic material. In other illustrative examples, thermoplastic material 422 may comprise thermoplastic material braided over tacked thermoplastic material, the tacked thermoplastic material placed directly onto metallic bladder 430. In other illustrative examples, thermoplastic material 422 may be placed on the metallic bladder 430 by a hand layup process.

To consolidate structure 404, power may be supplied to plurality of induction coils 410 to produce a magnetic field. In response to the magnetic field, die liner 418 and die liner 420 may generate heat.

Metallic bladder 430 may be pressurized. Metallic bladder 430 is positioned within structure 404 such that metallic bladder 430 contacts thermoplastic material 422 of structure 404. When pressurized, metallic bladder 430 may impart a compressive force to structure 404. When thermoplastic material 422 is a braided thermoplastic material, slits of thermoplastic material 422 may move relative to each other. This movement of the braided slits of thermoplastic material 422 may occur when metallic bladder 430 expands under pressure. Movement of the braided slits of thermoplastic material 422 may improve the quality of resulting structure 404. First die 406 and second die 408 define an outer mold line for structure 404. When metallic bladder 430 is pressurized, first die 406 and second die 408 provide resistant pressure. In other words, first die 406 and second die 408 may provide a substantially rigid outer mold line for structure 404.

As structure 404 is heated and compressed, thermoplastic material 422 is consolidated. During heating and compression, resin of thermoplastic material 422 flows and solidifies.

The illustration of FIG. 4 is not meant to imply physical or architectural limitations to the manner in which an illustrative embodiment may be implemented. Other components in addition to or in place of the ones illustrated may be used. Some components may be unnecessary.

For example, rather than metallic bladder 430, composite material may be laid up on a mandrel to form structure 404. In one illustrative example, a mandrel within structure 404 may comprise a soluble material. In one illustrative example, a soluble material may be soluble in water. In this illustrative example, a soluble material may be selected from at least one of a ceramic, a graphite, or other suitable material which is soluble in water. In another illustrative example, a mandrel within structure 404 may comprise a non-soluble material.

In yet another illustrative example, a mandrel within structure 404 may comprise both a soluble material and a second material configured to generate heat in response to a magnetic field. In one illustrative example, a soluble material may be soluble in water. In this illustrative example, a soluble material may be selected from at least one of a ceramic, a graphite, or other suitable material which is soluble in water. In some illustrative examples, the material of the mandrel may expand during heating to apply pressure to structure 404.

In other illustrative examples, a metallic bladder may be positioned over a mandrel. While the metallic bladder is over the mandrel, composite material may be laid up over the metallic bladder. As a result, both a metallic bladder and a mandrel may be present within structure 404 during consolidation. In these illustrative examples, the mandrel may provide support for moving structure 404 prior to consolidation. The metallic bladder may provide pressure during consolidation of structure 404.

Figure 5:
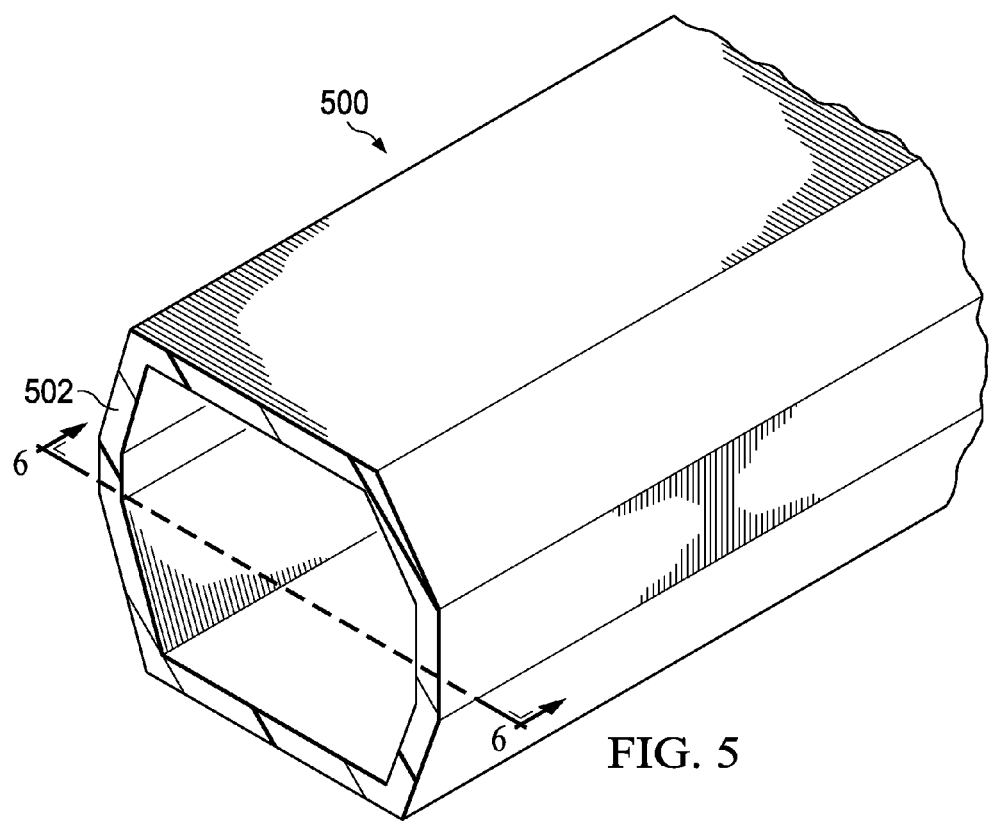
FIG. 5 is an illustration of a structure produced in accordance with an illustrative embodiment.

Turning now to FIG. 5, an illustration of a structure produced is depicted in accordance with an illustrative embodiment. Structure 500 may be a physical embodiment of structure 206 formed using tool 202 of FIG. 2. Structure 500 may be a physical embodiment of structure 404 of FIG. 4 following consolidation in tool 402 and removal of metallic bladder 430. Structure 500 may comprise a duct or structural stiffener for aircraft 100 of FIG. 1. Additionally, structure 500 may be cut into two structural stiffeners for wing 104 of aircraft 100 of FIG. 1.

As depicted in FIG. 5, structure 500 comprises a substantially constant thickness of composite material. Additionally, as depicted, structure 500 has a substantially constant cross-section throughout structure 500. However, in other illustrative examples, structure 500 may have a varying composite material thickness. For example, structure 500 may have ply drops-offs, ply additions, ramp ups, ramp downs, or other changes in the number or location of plies causing varying composite material thickness. In another illustrative example, structure 500 may have a varying cross-section. In some illustrative examples, structure 500 may be used in an aircraft or other platform after consolidation. In other illustrative examples, structure 500 may be cut to produce a plurality of products. Each of the plurality of products will comprise a portion of cross-section 502 of structure 500.

Figure 6:
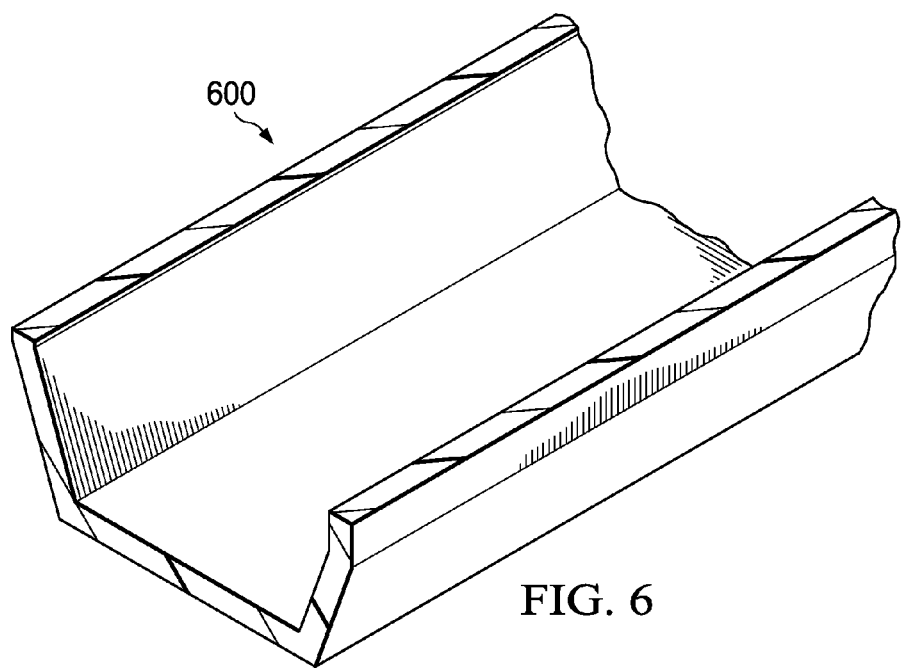
FIG. 6 is an illustration of a product created from a structure in accordance with an illustrative embodiment.

Turning now to FIG. 6, an illustration of a product created from a structure is depicted in accordance with an illustrative embodiment. Specifically, product 600 may be a physical embodiment of a product formed by cutting structure 500 of FIG. 5 along line 6-6. Product 600 may be a physical embodiment of a product formed by cutting structure 206 of FIG. 2. Product 600 may be a structural stiffener for wing 104 of aircraft 100 of FIG. 1. Cutting product 600 from structure 500 may produce product 600 more quickly than individually stamp forming product 600.

Figure 7:
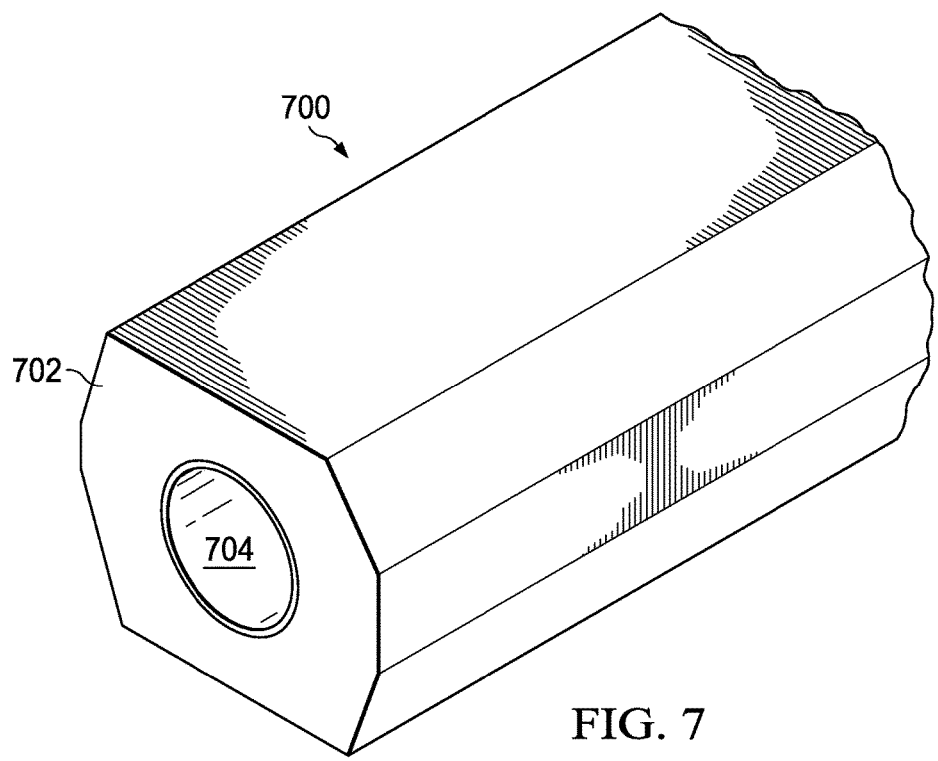
FIG. 7 is an illustration of a perspective view of a mandrel in accordance with an illustrative embodiment.

Turning now to FIG. 7, an illustration of a perspective view of a mandrel is depicted in accordance with an illustrative embodiment. In this depicted example, mandrel 700 is an example of a physical implementation of mandrel 242 of FIG. 2. Specifically, mandrel 700 may be mandrel 242 of FIG. 2 comprising first material 244 in the form of soluble material 248 and second material 246 in the form of metallic tube 252. Mandrel 700 may be used to manufacture an aircraft part such as a structural stiffener of wing 104 of aircraft 100 of FIG. 1.

As depicted, mandrel 700 has a substantially constant cross-section. In some illustrative examples, mandrel 700 may have varying cross-sectional features. The cross-section of mandrel 700 may change in height, width, shape, or other characteristic along mandrel 700. In some illustrative examples, mandrel 700 may have a different cross-sectional shape than the shape depicted. In one illustrative example, mandrel 700 may have a circular cross-sectional shape. In another illustrative example, mandrel 700 may have a triangular cross-sectional shape. Mandrel 700 comprises first material 702 formed into a cross-sectional shape substantially similar to a desired cross-section of a resulting structure.

Mandrel 700 also comprises second material 704 formed into a tube. First material 702 comprises a soluble material. In one illustrative example, a soluble material may be soluble in water. In this illustrative example, a soluble material may be selected from at least one of a ceramic, a graphite, or other suitable material which is soluble in water. Second material 704 comprises a material configured to generate heat in response to a magnetic field. In some illustrative examples, second material 704 is Invar. Second material 704 may be selected based on at least one of a desired consolidation temperature and the Curie temperature of the number of die liners to be used. As a result, second material 704 may be Invar when the Curie temperature of Invar is desirable taking into account the desired consolidation temperature and the Curie temperature of the number of die liners. Invar may be selected as second material 704 based on other properties of Invar. Specifically, the coefficient of thermal expansion of Invar may be desirable for use in composite material processing. The coefficient of thermal expansion of Invar may be substantially similar to the coefficient of thermal expansion of composite material.

Second material 704 may provide reinforcement to first material 702. In some illustrative embodiments, second material 704 may increase rigidity of mandrel 700.

Mandrel 700 may act as a forming tool for a thermoplastic material, such as thermoplastic material 236 of FIG. 2. During formation of a structure, composite material may be laid onto mandrel 700. After laying composite material, mandrel 700 may be placed into a tool such as tool 202 of FIG. 2 for consolidation of the composite material. In one illustrative example, braided composite material may be laid onto mandrel 700 to form a structure. In another illustrative example, tacked thermoplastic material may be laid onto mandrel 700 to form a structure. In yet another illustrative example, a combination of braided composite material and tacked composite material may be laid onto mandrel 700 to form a structure. Thus, mandrel 700 may define a cavity in a structure, such as structure 404 of FIG. 4. As a result, mandrel 700 maintains or substantially maintains the shape of the cavity during consolidation.

During consolidation, second material 704 may generate heat in response to a magnetic field generated by a plurality of induction coils, such as plurality of induction coils 222 of FIG. 2. In some illustrative examples, second material 704 may generate heat after heating of a die liner proceeds until the die liner is nearly non-magnetic. This die liner may be a die liner in number of die liners 226 of FIG. 2.

Figure 8:
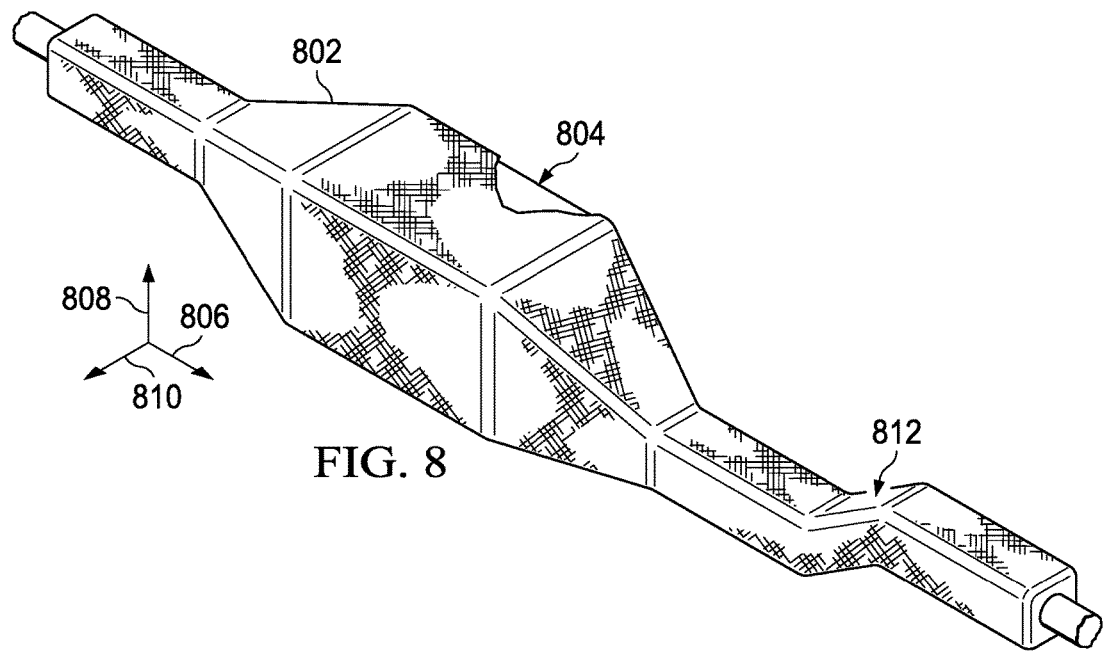
FIG. 8 is an illustration of a braided thermoplastic material over a forming tool in accordance with an illustrative embodiment.

Turning now to FIG. 8, an illustration of a braided thermoplastic material over a forming tool is depicted in accordance with an illustrative embodiment. Braided thermoplastic material 802 may be a physical implementation of braided thermoplastic material 238 of FIG. 2. Mandrel 804 may be a physical implementation of mandrel 242 of FIG. 2.

As depicted, mandrel 804 within braided thermoplastic material 802 comprises a varying cross-section. Specifically, the cross-section of mandrel 804 varies along axis 806. More specifically, the size of cross-section of mandrel 804 varies along axis 806 and includes joggle 812. Yet more specifically, the height along axis 808 and width along axis 810 of mandrel 804 vary along axis 806. In other illustrative examples, cross-section of mandrel 804 may include a change in shape, a twist, a bend, or other desirable change.

In some illustrative examples, after placing braided thermoplastic material 802 onto mandrel 804, tacked thermoplastic material may be added to all or portions of braided thermoplastic material 802. Tacked thermoplastic material may form areas of varying thickness in a resulting structure. After all desired thermoplastic material is placed onto mandrel 804, the mandrel 804 may be placed into a tool such as tool 202 of FIG. 2 for consolidation.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 can be implemented as physical structures.

Figure 9:
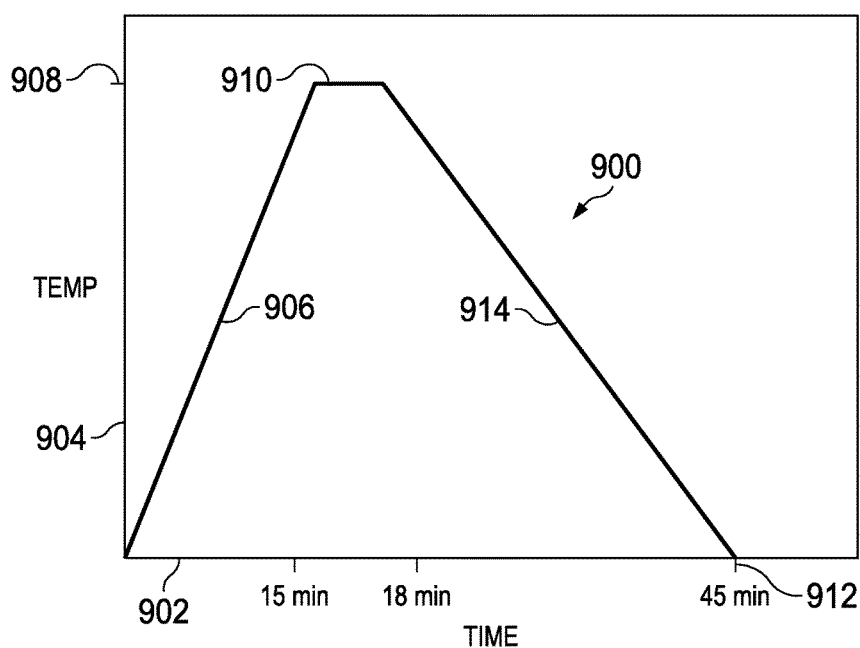
FIG. 9 is an illustration of a temperature cycle in accordance with an illustrative embodiment.

Turning now to FIG. 9, an illustration of a temperature cycle is depicted in accordance with an illustrative embodiment. Temperature cycle 900 may be an illustrative example of a temperature cycle for tool 202 of FIG. 2 in structure 206.

Temperature cycle 900 has x axis 902 and y axis 904. Temperature cycle 900 represents the consolidation of a structure comprising a thermoplastic material in a tool. The tool comprises an inductive heating tool.

X axis 902 represents time in minutes. Y axis 904 represents temperature. In temperature cycle 900, the tool takes approximately 15 minutes, as represented by ramp 906, to heat the structure to consolidating temperature 908. Afterwards, consolidating temperature 908 is held for approximately 3 minutes, as represented by hold 910. Following hold 910, the structure is controllably cooled to room temperature 912, as represented by ramp 914.

In some illustrative examples, the structure is cooled in ramp 914 at a rate to produce desirable material characteristics. For example, the structure may be cooled at a rate to produce a desired degree of crystallinity in the thermoplastic material of the structure. In some illustrative examples, the structure is cooled in ramp 914 at a rate to prevent undesirable material characteristics.

As depicted, temperature cycle 900 for consolidation of the structure in the tool is significantly shorter than curing a thermoset material. Further, as depicted, temperature cycle 900 for consolidation of the structure in the tool may take less time than consolidation using a resistive heating tool. Accordingly, by using temperature cycle 900, manufacturing time of thermoplastic structures may be reduced. Further, by using temperature cycle 900, manufacturing costs may be reduced.

Figure 10:
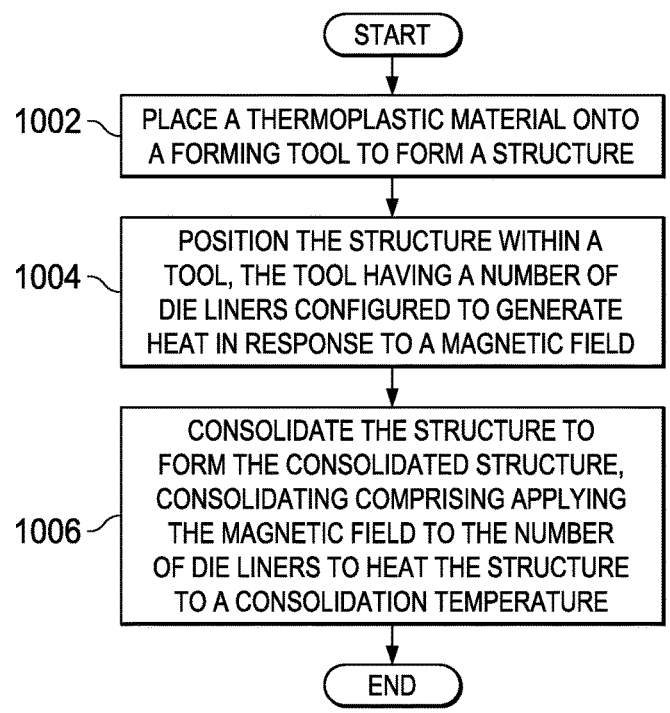
FIG. 10 is an illustration of a flowchart of a process for forming a thermoplastic structure in accordance with an illustrative embodiment.

Turning now to FIG. 10, an illustration of a flowchart of a process for forming a thermoplastic structure is depicted in accordance with an illustrative embodiment. The process illustrated in FIG. 10 may be implemented in manufacturing environment 200 of FIG. 2. Further, this process may be implemented using tool 202 of FIG. 2 to form structure 206 of FIG. 2.

The process may begin by placing a thermoplastic material onto a forming tool to form a structure (operation 1002). In some illustrative examples, placing the thermoplastic material may comprise placing a braided thermoplastic material. In some illustrative examples, placing the thermoplastic material may comprise placing a tacked thermoplastic material. Specifically, in an illustrative example, placing the thermoplastic material may comprise placing a braided thermoplastic material onto a mandrel. In another illustrative example, placing the thermoplastic material may comprise placing a braided thermoplastic material onto a metallic bladder. In yet another illustrative example, placing the thermoplastic material comprises placing a braided thermoplastic material onto a mandrel and placing a tacked thermoplastic material over the braided thermoplastic material on the mandrel, the tacked thermoplastic material laid down using laser assisted fiber placement equipment.

The process may then position the structure within a tool, the tool having a number of die liners configured to generate heat in response to a magnetic field (operation 1004). The number of die liners may be number of die liners 226 of FIG. 2. In some illustrative examples, the forming tool comprises a mandrel and consolidating the structure to form the consolidated structure may also comprise applying the magnetic field to the mandrel.

The process may then consolidate the structure to form the consolidated structure, consolidating comprising applying a magnetic field to the number of die liners to heat the structure to a consolidation temperature (operation 1006). In one illustrative example, the forming tool comprises a metallic bladder and a mandrel, and consolidating the structure to form the consolidated structure further comprises pressurizing the metallic bladder such that the metallic bladder imparts a compressive force. Afterwards, the process terminates.

In some illustrative examples, the process may comprise additional operations. For example, the process may further comprise dissolving a first material of a mandrel from within the consolidated structure. Further, the process may further comprise the forming tool comprising a metallic bladder and a mandrel, and wherein consolidating the structure to form the consolidated structure further comprises pressurizing the metallic bladder such that the metallic bladder imparts a compressive force.

When the thermoplastic material is a braided thermoplastic material, slits of the thermoplastic material may move relative to each other. This movement of the braided slits of thermoplastic material may occur when the metallic bladder expands under pressure. Movement of the braided slits of thermoplastic material may improve the quality of the resulting structure.

Figure 11:
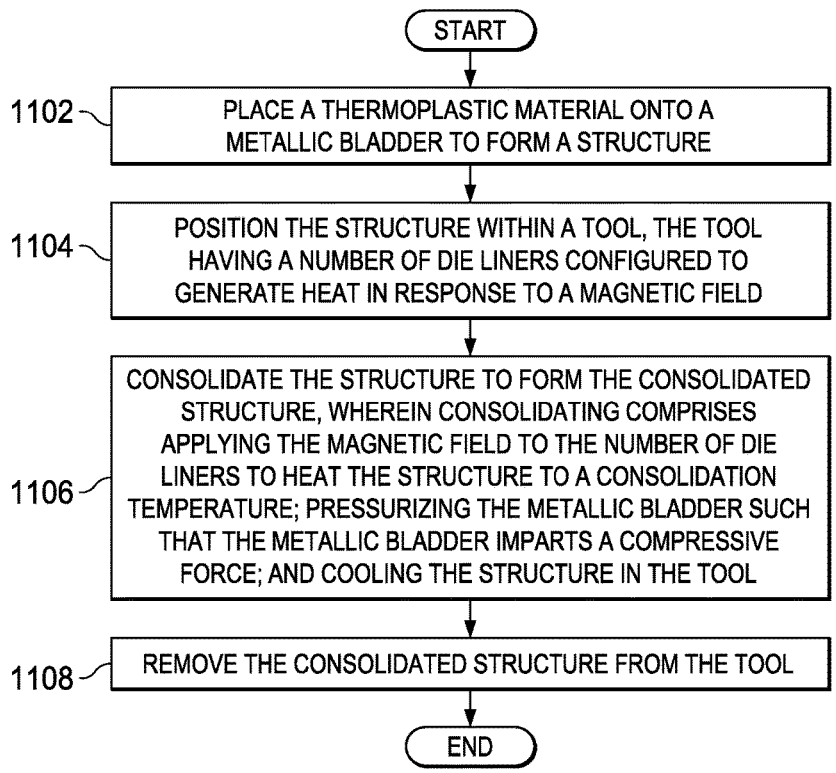
FIG. 11 is an illustration of a flowchart of a process for forming a thermoplastic structure in accordance with an illustrative embodiment.

Turning now to FIG. 11, an illustration of a flowchart of a process for forming a thermoplastic structure is depicted in accordance with an illustrative embodiment. The process illustrated in FIG. 11 may be implemented in manufacturing environment 200 of FIG. 2. Further, this process may be implemented using tool 202 of FIG. 2 to form structure 206 of FIG. 2.

The process may begin by placing a thermoplastic material onto a metallic bladder to form a structure (operation 1102). The process may then position the structure within a tool, the tool having a number of die liners configured to generate heat in response to a magnetic field (operation 1104). The number of die liners may be number of die liners 226 of FIG. 2. The process may then consolidate the structure to form the consolidated structure, wherein consolidating comprises applying a magnetic field to the number of die liners to heat the structure to a consolidation temperature, pressurizing the metallic bladder such that the metallic bladder imparts a compressive force, and cooling the structure in the tool (operation 1106). When the thermoplastic material is a braided thermoplastic material, slits of the thermoplastic material may move relative to each other. This movement of the braided slits of thermoplastic material may occur when the metallic bladder expands under pressure. Movement of the braided slits of thermoplastic material may improve the quality of the resulting structure.

The process may then remove the consolidated structure from the tool (operation 1108). Afterwards, the process terminates.

In some illustrative examples, the process may comprise additional operations. For example, the process may further comprise cutting the consolidated structure to form a plurality of products. In some illustrative examples, placing the thermoplastic material onto the metallic bladder comprises placing a braided thermoplastic material over the metallic bladder. In other illustrative examples, the process may comprise placing a tacked thermoplastic material over the braided thermoplastic material on the metallic bladder, the tacked thermoplastic material laid down using laser assisted fiber placement equipment.

Figure 12:
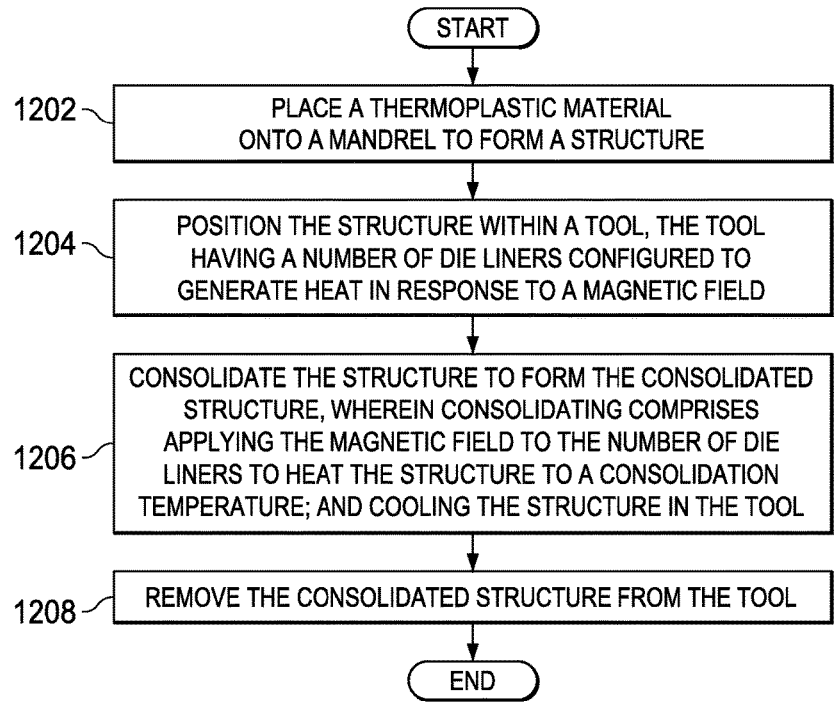
FIG. 12 is an illustration of a flowchart of a process for forming a thermoplastic structure in accordance with an illustrative embodiment.

Turning now to FIG. 12, an illustration of a flowchart of a process for forming a thermoplastic structure is depicted in accordance with an illustrative embodiment. The process illustrated in FIG. 12 may be implemented in manufacturing environment 200 of FIG. 2. Further, this process may be implemented using tool 202 of FIG. 2 to form structure 206 of FIG. 2.

The process may begin by placing a thermoplastic material onto a mandrel to form a structure (operation 1202). The thermoplastic material may comprise at least one of a braided thermoplastic material, a tacked thermoplastic material, or any other suitable thermoplastic material. In one illustrative example, the mandrel comprises a first material that is soluble and a second material that is configured to generate heat in response to the magnetic field.

The process may then position the structure within a tool, the tool having a number of die liners configured to generate heat in response to a magnetic field (operation 1204). The number of die liners may be number of die liners 226 of FIG. 2. The process may then consolidate the structure to form the consolidated structure, wherein consolidating comprises applying a magnetic field to the number of die liners to heat the structure to a consolidation temperature, and cooling the structure in the tool (operation 1206). The process may then remove the consolidated structure from the tool (operation 1208). In some illustrative examples, the process may comprise additional operations. For example, in one illustrative example, the process may further comprise cutting the consolidated structure to form a plurality of products. Afterwards, the process terminates.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1300 in FIG. 13.

One or more illustrative embodiments may be used during component and subassembly manufacturing 1306. For example, structure 206 in FIG. 2 may be formed using tool 202 during component and subassembly manufacturing 1306. Further, structure 206 may also be used to perform replacements during maintenance and service 1314. For example, aircraft 1400 may be inspected during scheduled maintenance for aircraft 1400. Structure 206 may be part of aircraft 1400 such as part of airframe 1402 or systems 1404.

The illustrative embodiments provide a method and apparatus for forming a thermoplastic structure. Specifically, the illustrative embodiments provide a method and apparatus for forming a thermoplastic structure using inductive heating. A structure comprises thermoplastic material. The thermoplastic material may comprise braided thermoplastic material 238, tacked thermoplastic material 240, or both, as seen in FIG. 2. By using plurality of induction coils 222 and number of die liners 226 of tool 202, structure 206 may be consolidated, as seen in FIG. 2. During consolidation, number of die liners 226 may heat in response to a magnetic field generated by plurality of induction coils 222. Further, during consolidation, second material 246 in mandrel 242 may heat in response to a magnetic field generated by plurality of induction coils 222, as seen in FIG. 2. Forming tool 208 shown in FIG. 2 may provide a compressive force during consolidation.

By forming thermoplastic structures according to the illustrative embodiments, manufacturing time may be decreased. By forming thermoplastic structures according to illustrative embodiments, manufacturing costs for the structures may be decreased. Further, the illustrative embodiments may create thermoplastic structures with closed cross-sections. Additionally, the illustrative embodiments may create thermoplastic structures with ply drops.

In an illustrative embodiment, a method of forming a consolidated structure is provided. The method comprises placing a thermoplastic material onto a forming tool to form a structure; positioning the structure within a tool; and consolidating the structure to form the consolidated structure. The tool has a number of die liners configured to generate heat in response to a magnetic field. Consolidating comprises applying a magnetic field to the number of die liners to heat the structure to a consolidation temperature.

In some examples, placing the thermoplastic material onto the forming tool to form the structure comprises placing a braided thermoplastic material over a mandrel. In some examples, placing the thermoplastic material onto the forming tool to form the structure comprises placing a braided thermoplastic material over a mandrel, and the mandrel comprises a first material that is soluble and a second material that is configured to generate heat in response to the magnetic field. In some examples, placing the thermoplastic material onto the forming tool to form the structure comprises placing a braided thermoplastic material over a mandrel, consolidating the structure to form the consolidated structure further comprises applying the magnetic field to the mandrel, and the mandrel comprises a first material that is soluble and a second material that is configured to generate heat in response to the magnetic field.

In the illustrative examples, placing the thermoplastic material onto the forming tool to form the structure comprises placing a braided thermoplastic material over a mandrel and placing a tacked thermoplastic material over the braided thermoplastic material on the mandrel, the tacked thermoplastic material laid down using laser assisted fiber placement equipment. In some examples, placing the thermoplastic material onto the forming tool to form the structure comprises placing a braided thermoplastic material over a mandrel, the mandrel comprises a first material that is soluble and a second material that is configured to generate heat in response to the magnetic field, and the method further comprises dissolving the first material from within the consolidated structure.

In some examples, the forming tool comprises a metallic bladder and a mandrel, and consolidating the structure to form the consolidated structure further comprises pressurizing the metallic bladder such that the metallic bladder imparts a compressive force. In some examples, placing the thermoplastic material to form the structure comprises placing a braided thermoplastic material onto a metallic bladder, and consolidating the structure to form the consolidated structure further comprises pressurizing the metallic bladder such that the metallic bladder imparts a compressive force.

In some examples, placing the thermoplastic material to form the structure comprises placing a braided thermoplastic material onto a metallic bladder, consolidating the structure to form the consolidated structure further comprises pressurizing the metallic bladder such that the metallic bladder imparts a compressive force, and placing the thermoplastic material onto the forming tool to form the structure further comprises placing a tacked thermoplastic material over the braided thermoplastic material on the metallic bladder, the tacked thermoplastic material laid down using laser assisted fiber placement equipment.

In some examples, the number of die liners comprises a number of smart susceptors. In some examples, the method further comprises cutting the consolidated structure to form a plurality of products.

In another illustrative embodiment, a method of forming a consolidated structure is provided. The method comprises placing a thermoplastic material onto a metallic bladder to form a structure; positioning the structure within a tool; consolidating the structure to form the consolidated structure; and removing the consolidated structure from the tool. The tool has a number of die liners configured to generate heat in response to a magnetic field. Consolidating comprises applying a magnetic field to the number of die liners to heat the structure to a consolidation temperature; pressurizing the metallic bladder such that the metallic bladder imparts a compressive force; and cooling the structure in the tool.

In some examples, the method further comprises cutting the consolidated structure to form a plurality of products. In some examples, the number of die liners comprises a number of smart susceptors. In some examples, placing the thermoplastic material onto the metallic bladder comprises placing a braided thermoplastic material over the metallic bladder; and placing a tacked thermoplastic material over the braided thermoplastic material on the metallic bladder, the tacked thermoplastic material laid down using laser assisted fiber placement equipment.

In yet another illustrative embodiment, a method of forming a consolidated structure is provided. The method comprises placing a thermoplastic material onto a mandrel to form a structure; positioning the structure within a tool; consolidating the structure to form the consolidated structure; and removing the consolidated structure from the tool. The tool has a number of die liners configured to generate heat in response to a magnetic field. Consolidating comprises applying a magnetic field to the number of die liners to heat the structure to a consolidation temperature; and cooling the structure in the tool.

In some examples, the mandrel comprises a first material that is soluble and a second material that is configured to generate heat in response to the magnetic field, and consolidating the structure to form the consolidated structure further comprises applying the magnetic field to the mandrel. In some examples, the method further comprises cutting the consolidated structure to form a plurality of products.

In still yet a further illustrative embodiment, an apparatus is presented. The apparatus comprises a forming tool comprising at least one of a mandrel and a metallic bladder, the forming tool within a tool; and the tool. The tool comprises a plurality of dies creating a die cavity, a number of die liners within the die cavity, and a plurality of induction coils. Sections of the plurality of induction coils are embedded in the plurality of dies. In some examples, the apparatus further comprises a composite material on the forming tool, wherein the composite material and the forming tool are within the tool.

A method of forming a consolidated structure comprises placing a thermoplastic material onto a forming tool to form a structure; positioning the structure within a tool; and consolidating the structure to form the consolidated structure. The tool has a number of die liners configured to generate heat in response to a magnetic field. Consolidating comprises applying a magnetic field to the number of die liners to heat the structure to a consolidation temperature.

Figure 15:
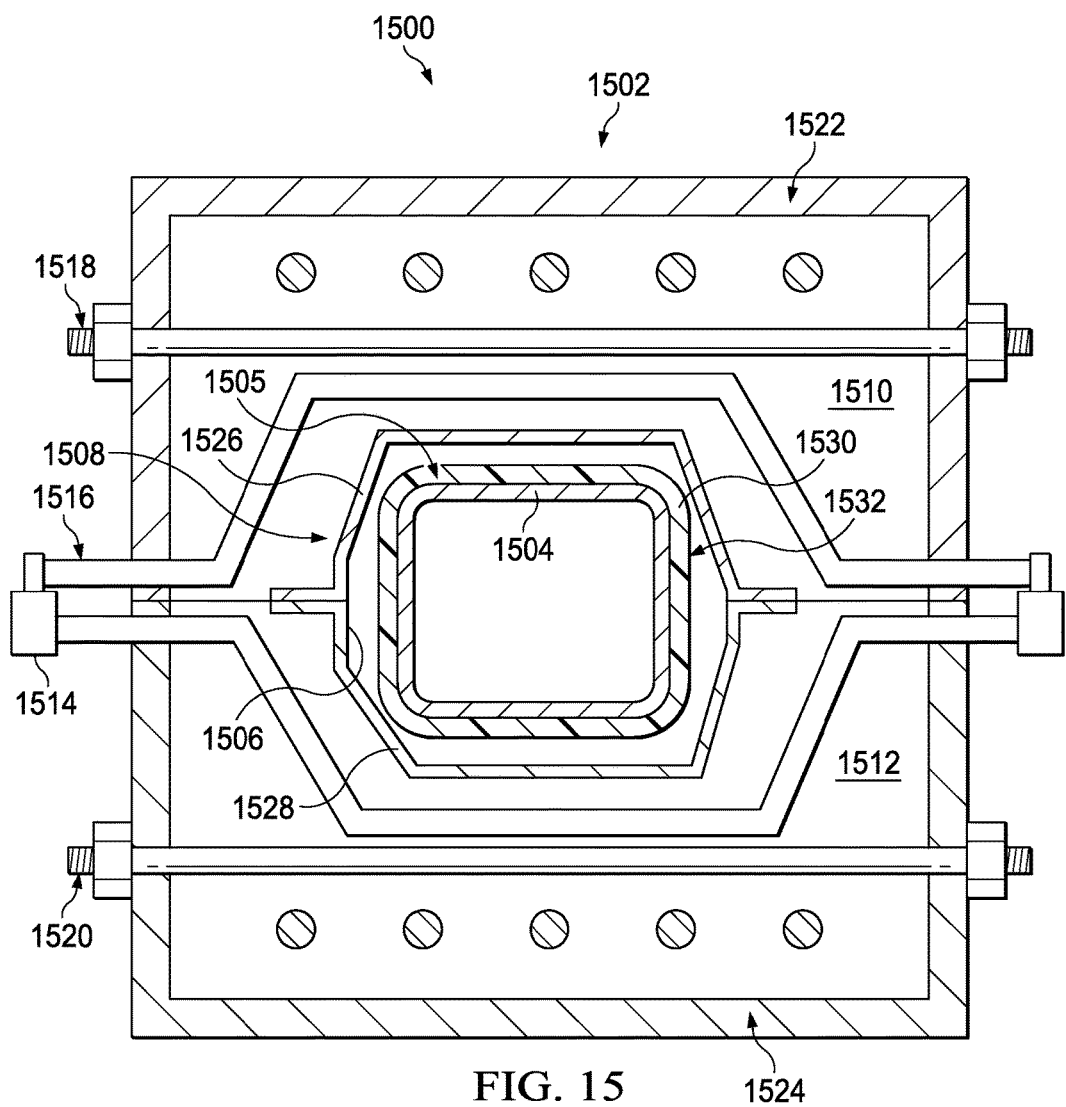
FIG. 15 is an illustration of a cross-sectional view of a metallic bladder within a tool in accordance with an illustrative embodiment.

Turning now to FIG. 15, an illustration of a cross-sectional view of a metallic bladder within a tool is depicted in accordance with an illustrative embodiment. View 1500 may be a cross-sectional view of a metallic bladder within tool 300 of FIG. 3. Specifically, view 1500 may be a cross-sectional view of a metallic bladder within tool 300 of FIG. 3 along lines 4-4. Tool 1502 may be a physical implementation of tool 202 in FIG. 2. Metallic bladder 1504 may be a physical implementation of metallic bladder 241 in FIG. 2.

View 1500 may be a view prior to a first forming of metallic bladder 1504. As depicted, metallic bladder 1504 has initial shape 1505. In this illustrative example, initial shape 1505 of metallic bladder 1504 is rectangular with rounded corners. Metallic bladder 1504 may be formed from a constant cross-section tubing or metal sheets. It may be desirable to form metallic bladder 1504 to a first shape different from initial shape 1505.

Die cavity 1506 has shape 1508. In some illustrative examples, it may be desirable for metallic bladder 1504 to be formed to substantially the same shape as shape 1508. In some illustrative examples, it may be desirable for metallic bladder 1504 to be formed to substantially the same shape as a shape of a structure to be formed using tool 1502 and metallic bladder 1504. Tool 1502 may be an induction tool which may also be used to form a structure through consolidation of thermoplastic material.

As depicted, metallic bladder 1504 is positioned within tool 1502. Specifically, metallic bladder 1504 is positioned between first die 1510 and second die 1512 within die cavity 1506 of tool 1502. Plurality of induction coils 1514 may run through first die 1510 and second die 1512. Plurality of induction coils 1514 may be joined by flexible sections 1516. Plurality of rods 1518 runs through first die 1510. Plurality of rods 1520 runs through second die 1512. First die 1510 and second die 1512 are held within load constraint 1522 and load constraint 1524.

Die liner 1526 is associated with first die 1510 within die cavity 1506. Die liner 1528 is associated with second die 1512 in die cavity 1506. Die liner 1526 and die liner 1528 may generate heat when exposed to a magnetic field generated by plurality of induction coils 1514. Die liner 1526 and die liner 1528 may be used to apply heat to metallic bladder 1504 during forming of metallic bladder 1504.

Die liner 1526 and die liner 1528 may be smart susceptors that generate heat to a designated temperature. Die liner 1526 and die liner 1528 may generate heat until about a consolidation temperature of a thermoplastic material. In these examples, die liner 1526 and die liner 1528 may first be used to form metallic bladder 1504. After forming metallic bladder 1504, die liner 1526 and die liner 1528 may be used to consolidate a structure formed of a thermoplastic material.

As depicted, composite material 1530 is placed around metallic bladder 1504. Composite material 1530 may be a sacrificial layer for the first forming of metallic bladder 1504. Composite material 1530 may have substantially the same shape and thickness as a structure to be formed by metallic bladder 1504.

Composite material 1530 comprises thermoplastic material 1532. Thermoplastic material 1532 may be formed using one or more composite layup processes. The one or more composite layup processes may be selected from at least one of braiding, tape layup, tow layup, or any other desirable composite layup process. In some illustrative examples, thermoplastic material 1532 may be placed on metallic bladder 1504 through a braiding process. Braided composite material may be laid down using braiding equipment such as braiding equipment 256 of FIG. 2. In one illustrative example, composite material may be braided directly onto metallic bladder 1504 to form thermoplastic material 1532.

In some illustrative examples, thermoplastic material 1532 may be placed on metallic bladder 1504 through a tape layup process. In one illustrative example, the tape layup process may lay composite material directly onto metallic bladder 1504. In some illustrative examples, the composite layup process may be a laser assisted fiber placement process. In these illustrative examples, thermoplastic composite material may be laid down using laser assisted fiber placement equipment such as laser assisted fiber placement equipment 258 of FIG. 2. Laser assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other.

In some illustrative examples, thermoplastic material 1532 may be placed on metallic bladder 1504 as a preform. In this illustrative example, thermoplastic material 1532 may be formed to a desired shape prior to being placed on metallic bladder 1504. In some illustrative examples, thermoplastic material 1532 may be consolidated or semi rigid as thermoplastic material 1532 is placed on metallic bladder 1504. In some illustrative examples, the preform may be created using laser assisted fiber placement equipment.

In yet other illustrative examples, thermoplastic material 1532 may comprise braided thermoplastic material braided onto metallic bladder 1504 and tacked thermoplastic material placed onto the braided thermoplastic material. In other illustrative examples, thermoplastic material 1532 may comprise thermoplastic material braided over tacked thermoplastic material, the tacked thermoplastic material placed directly onto metallic bladder 1504. In yet other illustrative examples, thermoplastic material 1532 may be placed on the metallic bladder 1504 by a hand layup process.

To form metallic bladder 1504, power may be supplied to plurality of induction coils 1514 to produce a magnetic field. In response to the magnetic field, die liner 1526 and die liner 1528 may generate heat. The heat generated by die liner 1526 and die liner 1528 may soften the material of metallic bladder 1504. By softening material of metallic bladder 1504, metallic bladder 1504 may be more malleable for shaping. Softening material of metallic bladder 1504 may allow for forming of the metallic bladder with introduction of minimal inconsistencies. Additionally, by softening material of metallic bladder 1504, shape of metallic bladder 1504 may be deformed to a greater extent without adding inconsistencies.

In some illustrative examples, metallic bladder 1504 and composite material 1530 may be heated to the consolidation temperature of thermoplastic material 1532. In some illustrative examples, metallic bladder 1504 and composite material 1530 may be heated above the consolidation temperature of thermoplastic material 1532. In some illustrative examples, metallic bladder 1504 and composite material 1530 may be heated above 700 degrees Fahrenheit.

Metallic bladder 1504 may be pressurized during forming. Pressurization of metallic bladder 1504 may cause metallic bladder 1504 to expand. As a result, when pressurized, metallic bladder 1504 may expand and substantially conform to a shape of the portion of die cavity 1506 not filled with composite material 1530. Composite material 1530 acts as a mock part during the forming of metallic bladder 1504. Composite material 1530 takes the place of a structure to be consolidated using metallic bladder 1504. Composite material 1530 may be substantially the same shape and cross-section as a structure to be consolidated using metallic bladder 1504.

The forming of metallic bladder 1504 may change metallic bladder 1504 from initial shape 1505 to a first shape. The forming of metallic bladder 1504 may change the shape of metallic bladder 1504 from about 5% to 20% without undesirable changes. In some examples, the forming of metallic bladder may be performed up to about 15% difference without undesirable changes.

In some illustrative examples, it may be desirable to change the shape of metallic bladder 1504 by more than the difference which is possible without desirable changes at about 700 degrees Fahrenheit. For example, sometimes it may be desirable to form metallic bladder 1504 to more than 15% difference which may result in undesirable properties, such as necking. In these illustrative examples, metallic bladder 1504 may be heated to a greater temperature than the consolidation temperature of a thermoplastic material. Specifically, metallic bladder 1504 may be superplastically formed.

In these illustrative examples, metallic bladder 1504 may be one or more aluminum alloys such as alloy 2004, alloy 5083, alloy 7475, or alloy 8090. As depicted in these illustrative examples, metallic bladder 1504 may be formed at a temperature substantially at or above about 700 degrees Fahrenheit. In some illustrative examples, metallic bladder 1504 may be formed above about 900 degrees Fahrenheit.

In these illustrative examples, die liner 1526 and die liner 1528 may be the same smart susceptors configured to consolidate the thermoplastic materials or may be different smart susceptors configured to generate heat to a temperature considerably higher than a consolidation temperature of a thermoplastic material. The material of die liner 1526 and die liner 1528 will affect the temperature achieved. When heating die liner 1526 and die liner 1528, a respective strain rate will be applied. For example, if alloy 2004 is used, metallic bladder 1504 may be heated to about 450 degrees Celsius with a strain rate of about $10^{-3}$. If alloy 5083 is used, metallic bladder 1504 may be heated to between about 350 degrees Celsius and about 450 degrees Celsius with a strain rate of about $10^{-3}$. Further, if alloy 7475 is used, metallic bladder 1504 may be heated to between about 500 degrees Celsius and about 515 degrees Celsius with a strain rate of about $10^{-4}$. Yet further, if alloy 8090 is used, metallic bladder 1504 may be heated to about 510 degrees Celsius to about 545 degrees Celsius with a strain rate of about $10^{-3}$.

In some illustrative examples, die liner 1526 and die liner 1528 may heat metallic bladder 1504 to about 935 degrees Fahrenheit or about 500 degrees Celsius. In these illustrative examples, die liner 1526 and die liner 1528 may be formed of Alloy 52. In these illustrative examples, die liner 1526 and die liner 1528 may be used to form metallic bladder 1504, afterwards die liner 1526 and die liner 1528 may be replaced with other die liners to consolidate a thermoplastic material.

When metallic bladder 1504 expands, metallic bladder 1504 may impart a compressive force to composite material 1530. However, the pressure applied by metallic bladder 1504 may not be desirable for consolidation of thermoplastic material 1532. Specifically, the pressure may be higher than a consolidation pressure for thermoplastic material 1532. In some examples, the pressure applied to metallic bladder may be about 250 pounds per square inch (psi). Further, the heat applied during forming of metallic bladder 1504 may not be desirable for consolidation of thermoplastic material 1532. Accordingly, composite material 1530 may be discarded following forming of metallic bladder 1504.

The illustration of FIG. 15 is not meant to imply physical or architectural limitations to the manner in which an illustrative embodiment may be implemented. Other components in addition to or in place of the ones illustrated may be used. Some components may be unnecessary.

In some illustrative examples, thermoplastic material 1532 may not be placed on metallic bladder 1504. Instead, thermoplastic material 1532 may be placed within die cavity 1506. Metallic bladder 1504 may then be placed on thermoplastic material 1532. In other illustrative examples, thermoplastic material 1532 may not be present. Instead, a number of placeholders formed of another material, such as a ceramic or a metal, may be placed within die cavity 1506.

Instead of thermoplastic material 1532, this number of placeholders may be used to form the shape of metallic bladder 1504 under heat and pressure. In some examples, the number of placeholders may have substantially the same size and shape as a structure to be formed. In these examples, the number of placeholders may be called a number of mock parts.

In some illustrative examples, the number of placeholders maybe placed around metallic bladder 1504. In one illustrative example, a placeholder formed of at least one of aluminum, aluminum alloy, magnesium, and magnesium alloy is placed around metallic bladder 1504. This placeholder may have the same or similar shape to composite material 1530.

Figure 16:
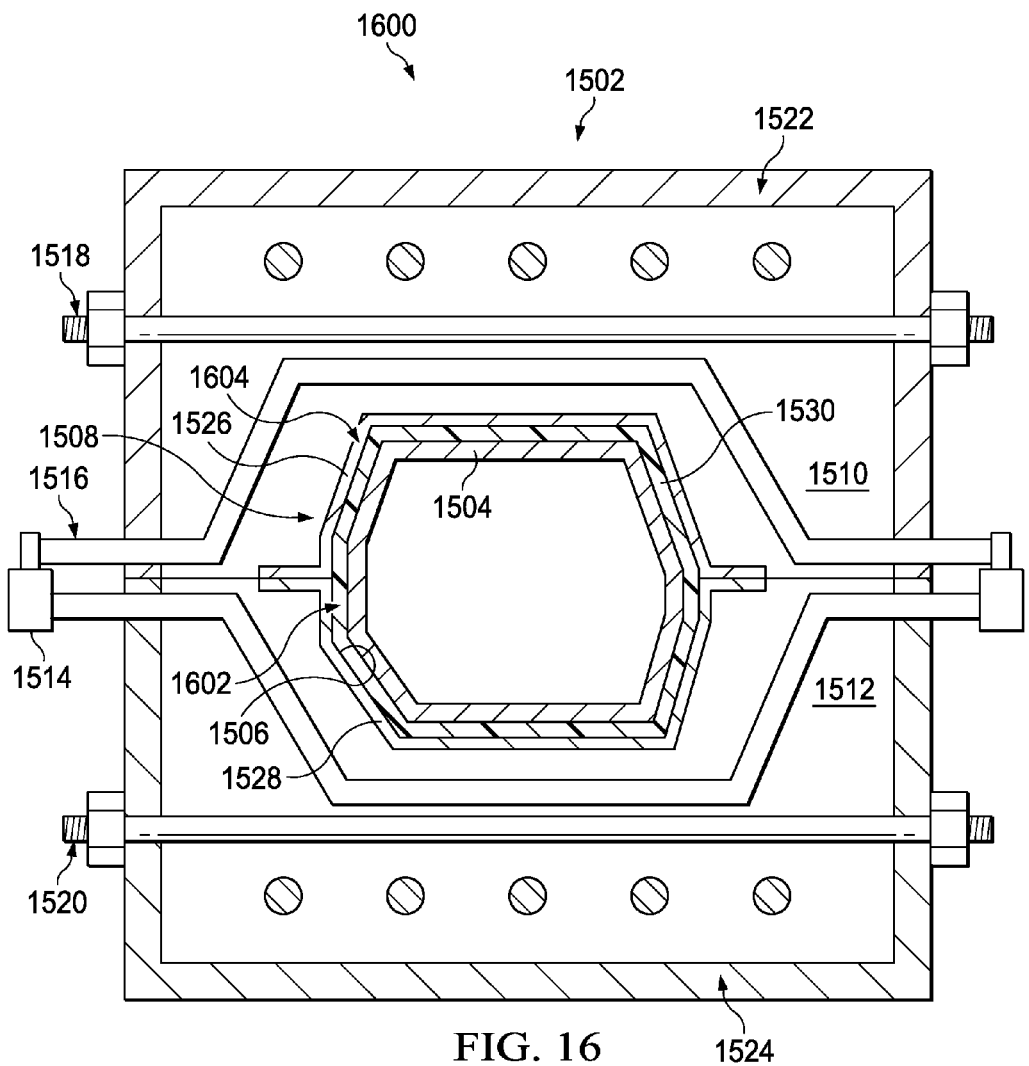
FIG. 16 is an illustration of a cross-sectional view of a metallic bladder within a tool in accordance with an illustrative embodiment.

Turning now to FIG. 16, an illustration of a cross-sectional view of a metallic bladder within a tool is depicted in accordance with an illustrative embodiment. View 1600 may be a cross-sectional view of a metallic bladder within tool 300 of FIG. 3. Specifically, view 1600 may be a cross-sectional view of a metallic bladder within tool 300 of FIG. 3 along lines 4-4.

Further, view 1600 may be a view present during forming of metallic bladder 1504. As depicted, metallic bladder 1504 may be heated and pressurized. In some illustrative examples, metallic bladder 1504 may have a pressure higher than a consolidation pressure for composite material 1530. In one illustrative example, metallic bladder 1504 may be pressurized to about 250 psi. As depicted, metallic bladder 1504 has expanded, pressing composite material 1530 against die liner 1526 and die liner 1528 within die cavity 1506.

As a result, when pressurized, metallic bladder 1504 may expand and substantially conform to a shape of the portion of die cavity 1506 not filled with composite material 1530. Composite material 1530 acts as a mock part during the forming of metallic bladder 1504. Composite material 1530 takes the place of a structure to be consolidated using metallic bladder 1504. Composite material 1530 may be substantially the same shape and cross-section as a structure to be consolidated using metallic bladder 1504.

Metallic bladder 1504 may have first shape 1602. First shape 1602 may be substantially similar to shape 1604 of die cavity 1506. In this illustrative example, first shape 1602 of metallic bladder 1504 is an octagon.

Figure 17:
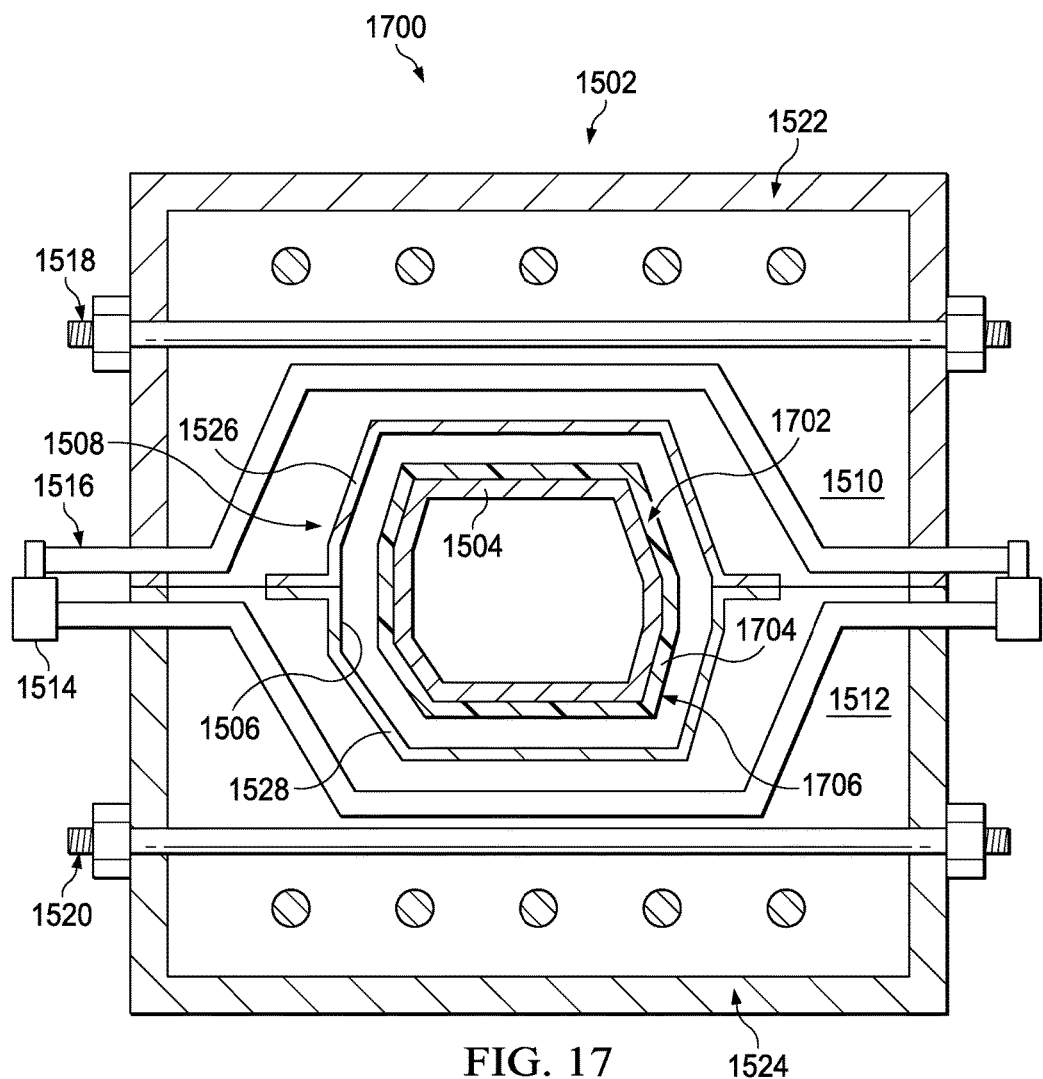
FIG. 17 is an illustration of a cross-sectional view of a metallic bladder and composite part within a tool in accordance with an illustrative embodiment.

FIG. 17 is an illustration of a cross-sectional view of a metallic bladder and composite part within a tool in accordance with an illustrative embodiment; View 1700 may be a cross-sectional view of a metallic bladder within tool 300 of FIG. 3. Specifically, view 1700 may be a cross-sectional view of a metallic bladder within tool 300 of FIG. 3 along lines 4-4. Tool 1502 may be a physical implementation of tool 202 in FIG. 2. Metallic bladder 1504 may be a physical implementation of metallic bladder 241 in FIG. 2.

View 1700 may be a view following a first forming of metallic bladder 1504. As depicted, metallic bladder 1504 has desired shape 1702. Desired shape 1702 may be the resulting shape for metallic bladder 1504 following a forming operation. In some illustrative examples, desired shape 1702 may be the resulting shape following a forming operation shown in FIG. 16. In this illustrative example, desired shape 1702 of metallic bladder 1504 is substantially similar to shape 1508 of die cavity 1506.

As depicted, thermoplastic material 1704 is placed onto metallic bladder 1504 having desired shape 1702. Thermoplastic material 1704 may be formed using one or more composite layup processes. The one or more composite layup processes may be selected from at least one of braiding, tape layup, tow layup, or any other desirable composite layup process. In some illustrative examples, thermoplastic material 1704 may be placed on metallic bladder 1504 through a braiding process. Braided composite material may be laid down using braiding equipment such as braiding equipment 256 of FIG. 2. In one illustrative example, composite material may be braided directly onto metallic bladder 1504 to form thermoplastic material 1704.

In some illustrative examples, thermoplastic material 1704 may be placed on metallic bladder 1504 through a tape layup process. In one illustrative example, the tape layup process may lay composite material directly onto metallic bladder 1504. In some illustrative examples, the composite layup process may be a laser assisted fiber placement process. In these illustrative examples, thermoplastic composite material may be laid down using laser assisted fiber placement equipment such as laser assisted fiber placement equipment 258 of FIG. 2. Laser assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other.

In some illustrative examples, thermoplastic material 1704 may be placed on metallic bladder 1504 as a preform. In this illustrative example, thermoplastic material 1704 may be formed to a desired shape prior to being placed on metallic bladder 1504. In some illustrative examples, thermoplastic material 1704 may be consolidated or semi rigid as thermoplastic material 1704 is placed on metallic bladder 1504. In some illustrative examples, the preform may be created using laser assisted fiber placement equipment.

In yet other illustrative examples, thermoplastic material 1704 may comprise braided thermoplastic material braided onto metallic bladder 1504 and tacked thermoplastic material placed onto the braided thermoplastic material. In other illustrative examples, thermoplastic material 1704 may comprise thermoplastic material braided over tacked thermoplastic material, the tacked thermoplastic material placed directly onto metallic bladder 1504. In other illustrative examples, thermoplastic material 1704 may be placed on the metallic bladder 1504 by a hand layup process.

To consolidate thermoplastic material 1704, power may be supplied to plurality of induction coils 1514 to produce a magnetic field. In response to the magnetic field, die liner 1526 and die liner 1528 may generate heat.

Metallic bladder 1504 may be pressurized. Metallic bladder 1504 is positioned within thermoplastic material 1704 such that metallic bladder 1504 contacts thermoplastic material 1704. When pressurized, metallic bladder 1504 may impart a compressive force to thermoplastic material 1704. When thermoplastic material 1704 is a braided thermoplastic material, slits of thermoplastic material 1704 may move relative to each other. This movement of the slits of thermoplastic material 1704 may occur when metallic bladder 1504 expands under pressure. Movement of the braided slits of thermoplastic material 1704 may improve the quality of resulting structure 1706. First die 1510 and second die 1512 define an outer mold line for resulting structure 1706. When metallic bladder 1504 is pressurized, first die 1510 and second die 1512 provide resistant pressure. In other words, first die 1510 and second die 1512 may provide a substantially rigid outer mold line for thermoplastic material 1704.

As thermoplastic material 1704 is heated and compressed, thermoplastic material 1704 is consolidated. During heating and compression, resin of thermoplastic material 1704 flows and solidifies.

Desired shape 1702 may result in a higher quality consolidated structure as metallic bladder 1504 may more closely resembles the desired shape of the final structure. By more closely resembling the shape of the final structure, metallic bladder 1504 may result in less rounding.

Figure 18:
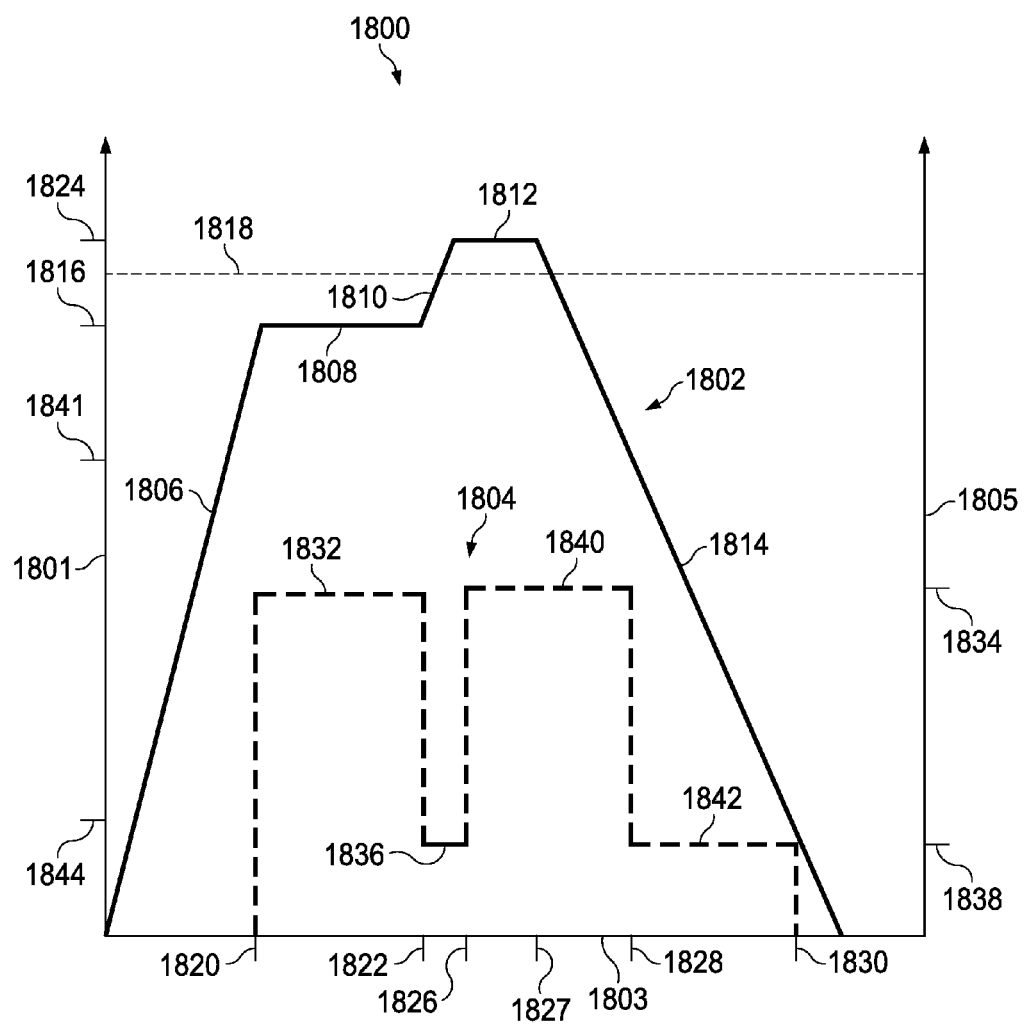
FIG. 18 is an illustration of a consolidation cycle for a composite part and metallic bladder in accordance with an illustrative embodiment.

Turning now to FIG. 18, an illustration of a consolidation cycle for a composite part and metallic bladder is depicted in accordance with an illustrative embodiment. Consolidation cycle 1800 may be an example of a consolidation cycle for consolidation of thermoplastic material 236 of FIG. 2. Consolidation cycle 1800 may be a consolidation cycle for consolidation of thermoplastic material 1704 using metallic bladder 1504 of FIG. 17.

As can be seen from FIG. 18, consolidation cycle 1800 includes temperature cycle 1802 and pressure cycle 1804. Temperature cycle 1802 depicts the behavior of temperature 1801 over time 1803 in consolidation cycle 1800. Pressure cycle 1804 depicts the behavior of pressure 1805 over time 1803 in consolidation cycle 1800. As discussed herein, temperature 1801 is the temperature of a thermoplastic material being consolidated, such as thermoplastic material 1704 of FIG. 17. As discussed herein, pressure 1805 is the pressure within a metallic bladder, such as metallic bladder 1504 of FIG. 17.

Temperature cycle 1802 includes ramp up 1806, hold 1808, ramp up 1810, hold 1812, and cool down 1814. In ramp up 1806 temperature 1801 has increased from room temperature to first temperature 1816. As can be seen from FIG. 18, first temperature 1816 is below melting temperature 1818 of the resin of the thermoplastic material to be consolidated. In some examples, first temperature 1816 may be about 50 degrees Fahrenheit less than melting temperature 1818. In some examples, first temperature 1816 may be about 575 degrees Fahrenheit. First temperature 1816 may be sufficient to soften the metal of the metallic bladder. In other words, first temperature 1816 may be sufficient to make the metal of the metallic bladder compliant.

Semi-crystalline thermoplastic resins exhibit distinct melt temperatures. Below a melt temperature for a thermoplastic material, the thermoplastic material is a "soft solid". Above the melting temperature, the resin of thermoplastic material is a liquid with decreasing viscosity as the temperature increases. Metal of the metallic bladder may exhibit significant softening from 400 degrees Fahrenheit to 600 degrees Fahrenheit. Metal of the metallic bladder may be very soft and pliable at temperatures above 500 degrees Fahrenheit. Therefore, rounding of the features of thermoplastic material may be significantly reduced or eliminated by the use of a number of metallic bladders pressurized to apply consolidation pressure just below the temperature where significant softening or melting of the resin of the thermoplastic material occurs.

Significant softening of the resin may result in the thermoplastic material not providing enough resistance to the metallic bladder. Significant softening may therefore result in rounding of the thermoplastic material. When the number of metallic bladders is pressurized below the temperature of significant softening, the metal of the metallic bladder may be formed over the thermoplastic material lay-up while it is still solid and, when the resin melts, the features may be maintained. In addition, de-bulking of the structure may be accomplished during the application of pressure. Since the resin is still solid the application of pressure can force removal or elimination of the air between the plies.

When pressure is applied to the thermoplastic material at first temperature 1816, the thermoplastic material may substantially retain its shape. When pressure is applied to the thermoplastic material at first temperature 1816, the thermoplastic material may experience reduced rounding of features.

During hold 1808, temperature 1801 is kept at first temperature 1816. Hold 1808 takes place from time 1820 to time 1822. Following hold 1808, temperature 1801 is increased from first temperature 1816 to second temperature 1824 during ramp up 1810. Ramp up 1810 occurs from time 1822 to time 1826. Following ramp up 1810, second temperature 1824 is maintained during hold 1812 from time 1826 to time 1827. As can be seen from FIG. 18, second temperature 1824 is above melting temperature 1818 of the thermoplastic material to be consolidated. As a result, at second temperature 1824, resin of the thermoplastic material is melted. In some illustrative examples, second temperature 1824 may be over 700 degrees Fahrenheit. In some illustrative examples, second temperature 1824 may be about 710 degrees Fahrenheit. Following hold 1812, temperature 1801 is reduced in a controlled manner to a desired temperature. In some examples, this desired temperature may be ambient temperature. Ambient temperature may be a room temperature of the manufacturing environment. In other illustrative examples, temperature 1801 may be reduced to at least about 50 degrees Fahrenheit below the glass transition temperature of the resin of the thermoplastic material. The structure may be removed from the tooling once the structure may be removed without deformation. In some examples, the structure may be removed from the tooling once the structure reaches about 50 degrees Fahrenheit below the glass transition temperature of the resin of the thermoplastic material.

Temperature 1801 may be reduced in a controlled manner to maintain desirable properties of the thermoplastic material. Temperature 1801 may be reduced by cooling the thermoplastic material of a preform structure at a controlled rate from second temperature 1824 to the ambient temperature. Cooling the preform structure at a controlled rate from second temperature 1824 to the ambient temperature may maintain desirable properties of the thermoplastic material. Specifically, controlled cooling may enable the formation of a desired degree of crystallinity. The degree of crystallinity affects mechanical and chemical properties of the material.

Pressure 1805 may be changed during consolidation of the thermoplastic to obtain desired characteristics of the thermoplastic. Further, pressure 1805 may be changed during consolidation of the thermoplastic to maintain the longevity of the metallic bladder. Changing pressure 1805 during consolidation of the thermoplastic may discourage rupture or leaking of the metallic bladder.

Pressure cycle 1804 includes hold 1832, hold 1836, hold 1840, and hold 1842. During hold 1832, pressure 1805 is maintained at first level 1834. First level 1834 may be sufficient to consolidate the thermoplastic material. In other words, first level 1834 of pressure 1805 may be sufficient to consolidate a preform structure. First level 1834 may be sufficient to result in consolidated structure with substantially no porosity. First level 1834 may be in the range of about 100 psi to about 200 psi.

Hold 1832 takes place from time 1820 to time 1822. Hold 1832 coincides with hold 1808 of temperature cycle 1802. In other words, pressure 1805 is maintained at first level 1834 while temperature 1801 is maintained at first temperature

1816. At time 1822, pressure 1805 is reduced to second level 1838. Hold 1836 takes place from time 1822 to time 1826. Hold 1836 coincides with ramp up 1810 of temperature cycle 1802. During hold 1836, pressure 1805 may be maintained at second level 1838 from time 1822 to time 1826. In other words, pressure 1805 may be reduced to second level 1838 as temperature 1801 is increased from first temperature 1816 to second temperature 1824. Maintaining pressure 1805 at second level 1838 may reduce the likelihood of rupture or leaking of the metallic bladder. Second level 1838 may be below the consolidation pressure of the thermoplastic material. Second level 1838 may be sufficient to maintain full contact between the metallic bladder and the thermoplastic material. In some illustrative examples, second level 1838 may be about 50 psi. In some illustrative examples, second level 1838 may be about 50 psi less than first level 1834.

Hold 1840 takes place from time 1826 to time 1828. Hold 1840 takes place during hold 1812 and part of cool down 1814 of temperature cycle 1802. In other words, pressure 1805 is maintained at first level 1834 while temperature 1801 is maintained at second temperature 1824. Further, pressure 1805 is maintained at first level 1834 while temperature 1801 drops until time 1828.

Hold 1842 takes place from time 1828 to time 1830. Hold 1842 takes place during parts of cool down 1814. Time 1828 may coincide with the thermoplastic material reaching predetermined temperature 1841. Predetermined temperature 1841 may be below a stress free temperature of thermoplastic material. A stress free temperature may be a temperature at which the crystallization of the thermoplastic material is about complete. During hold 1842 pressure 1805 is maintained at about second level 1838. Pressure may be maintained until a majority of crystalline domains of the thermoplastic material have finished nucleation and growth. Following time 1830, pressurization may be removed from metallic bladder. Time 1830 may coincide with the thermoplastic material reaching predetermined temperature 1844. Predetermined temperature 1844 may be below a glass transition temperature of thermoplastic material.

Figure 19:
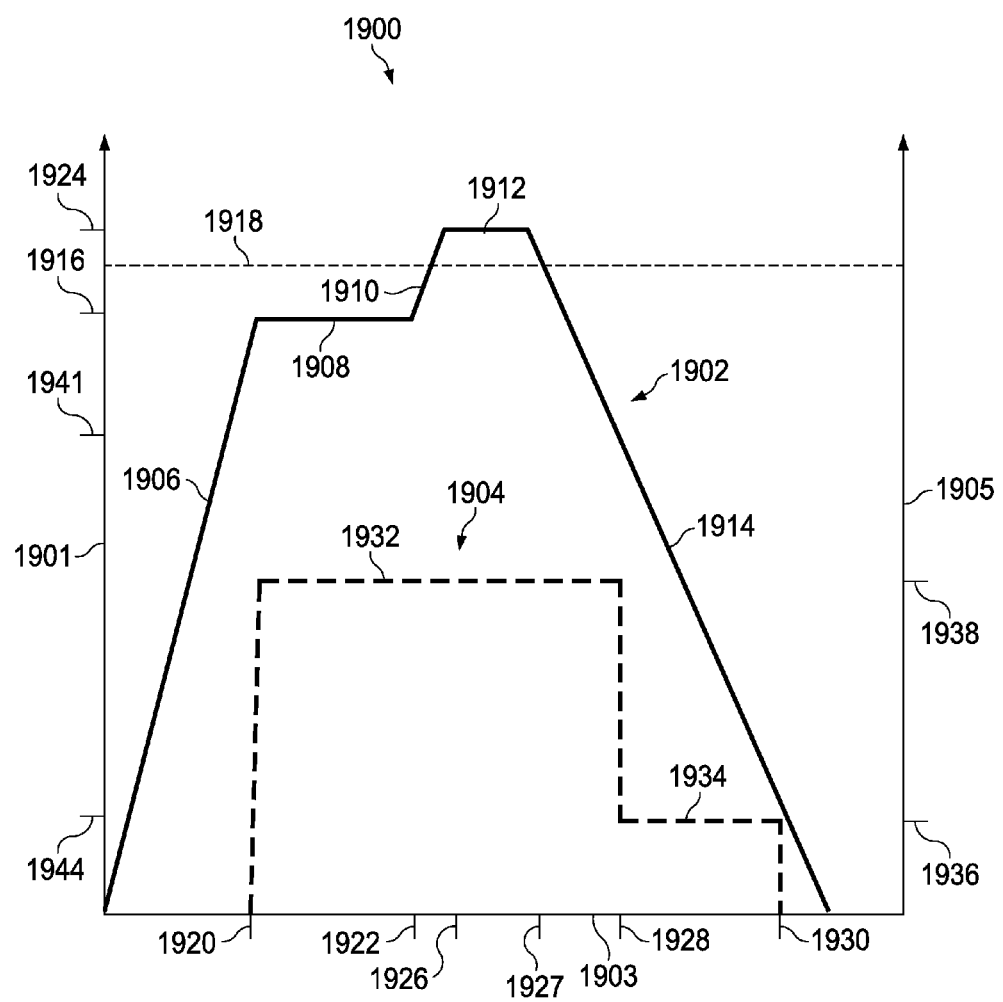
FIG. 19 is an illustration of a heating cycle for a composite part and metallic bladder in accordance with an illustrative embodiment.

Turning now to FIG. 19, an illustration of a heating cycle for a composite part and metallic bladder is depicted in accordance with an illustrative embodiment. Consolidation cycle 1900 may be an example of a consolidation cycle for consolidation of thermoplastic material 236 of FIG. 2. Consolidation cycle 1900 may be a consolidation cycle for consolidation of thermoplastic material 1704 using metallic bladder 1504 of FIG. 17.

As can be seen from FIG. 19, consolidation cycle 1900 includes temperature cycle 1902 and pressure cycle 1904. Temperature cycle 1902 depicts the behavior of temperature 1901 over time 1903 in consolidation cycle 1900. Pressure cycle 1904 depicts the behavior of pressure 1905 over time 1903 in consolidation cycle 1900. As discussed herein, temperature 1901 is the temperature of a thermoplastic material being consolidated, such as thermoplastic material 1704 of FIG. 17. As discussed herein, pressure 1905 is the pressure within a metallic bladder, such as metallic bladder 1504 of FIG. 17.

Temperature cycle 1902 includes ramp up 1906, hold 1908, ramp up 1910, hold 1912, and cool down 1914. In ramp up 1906 temperature 1901 increased from room temperature to first temperature 1916. As can be seen from FIG. 19, first temperature 1916 is below melting temperature 1918 of the resin of the thermoplastic material to be consolidated.

In some examples, first temperature 1916 may be about 50 degrees Fahrenheit less than melting temperature 1918. In some examples, first temperature 1916 may be about 575 degrees Fahrenheit. When pressure is applied to the thermoplastic material at first temperature 1816, the thermoplastic material may substantially retain its shape. When pressure is applied to the thermoplastic material at first temperature 1816, the thermoplastic material may experience reduced rounding of features.

During hold 1908, temperature 1901 is kept at first temperature 1916. Hold 1908 takes place from time 1920 to time 1922. Following hold 1908, temperature 1901 is increased from first temperature 1916 to second temperature 1924 during ramp up 1910. Ramp up 1910 occurs from time 1922 to time 1926. Following ramp up 1910, second temperature 1924 is maintained during hold 1912 from time 1926 to time 1927.

As can be seen from FIG. 19, second temperature 1924 is above melting temperature 1918 of the thermoplastic material to be consolidated. In some illustrative examples, second temperature 1924 may be over 700 degrees Fahrenheit. In some illustrative examples, second temperature 1924 may be about 710 degrees Fahrenheit.

Following hold 1912, temperature 1901 is reduced in a controlled manner to ambient temperature. Temperature 1901 may be reduced in a controlled manner to maintain desirable properties of the thermoplastic material.

Pressure 1905 may be changed during consolidation of the thermoplastic to obtain desired characteristics of the thermoplastic. Further, pressure 1905 may be changed during consolidation of the thermoplastic to maintain the longevity of the metallic bladder. Changing pressure 1905 during consolidation of the thermoplastic may discourage rupture or leaking of the metallic bladder.

Pressure cycle 1904 includes hold 1932 and hold 1934. During hold 1932, pressure 1905 is maintained at first level 1936. First level 1936 may be sufficient to consolidate the thermoplastic material. In other words, first level 1936 of pressure 1905 may be sufficient to consolidate a preform structure. First level 1936 may be sufficient to result in consolidated structure with substantially no porosity. First level 1936 may be in the range of about 100 psi to about 200 psi.

Hold 1932 takes place from time 1920 to time 1928. Time 1928 may coincide with the thermoplastic material reaching predetermined temperature 1941. Predetermined temperature 1941 may be below a stress free temperature of thermoplastic material. Hold 1932 takes place during hold 1908, ramp up 1910, hold 1912, and part of cool down 1914 of temperature cycle 1902. In other words, pressure 1905 is maintained at first level 1936 so long as temperature 1901 is maintained above predetermined temperature 1941 after time 1920. Further, pressure 1905 is maintained at first level 1936 while temperature 1901 drops until time 1928.

Hold 1934 takes place from time 1928 to time 1930. Hold 1934 takes place during parts of cool down 1914. Time 1928 may coincide with the thermoplastic material reaching predetermined temperature 1941. Predetermined temperature 1941 may be below a stress free temperature of thermoplastic material. During hold 1934, pressure 1905 is maintained at about second level 1938. Maintaining pressure 1905 at second level 1938 may reduce the likelihood of rupture or leaking of the metallic bladder. Second level 1938 may be below the consolidation pressure of the thermoplastic material. Second level 1938 may be sufficient to maintain full contact between the metallic bladder and the thermoplastic material. In some illustrative examples, second level 1938 may be about 50 psi. In some illustrative examples, second level 1938 may be about 50 psi less than first level 1936.

Following time 1930, pressurization may be removed from the metallic bladder. Time 1930 may coincide with the thermoplastic material reaching predetermined temperature 1944. Predetermined temperature 1944 may be below a glass transition temperature of thermoplastic material.

Figure 20:
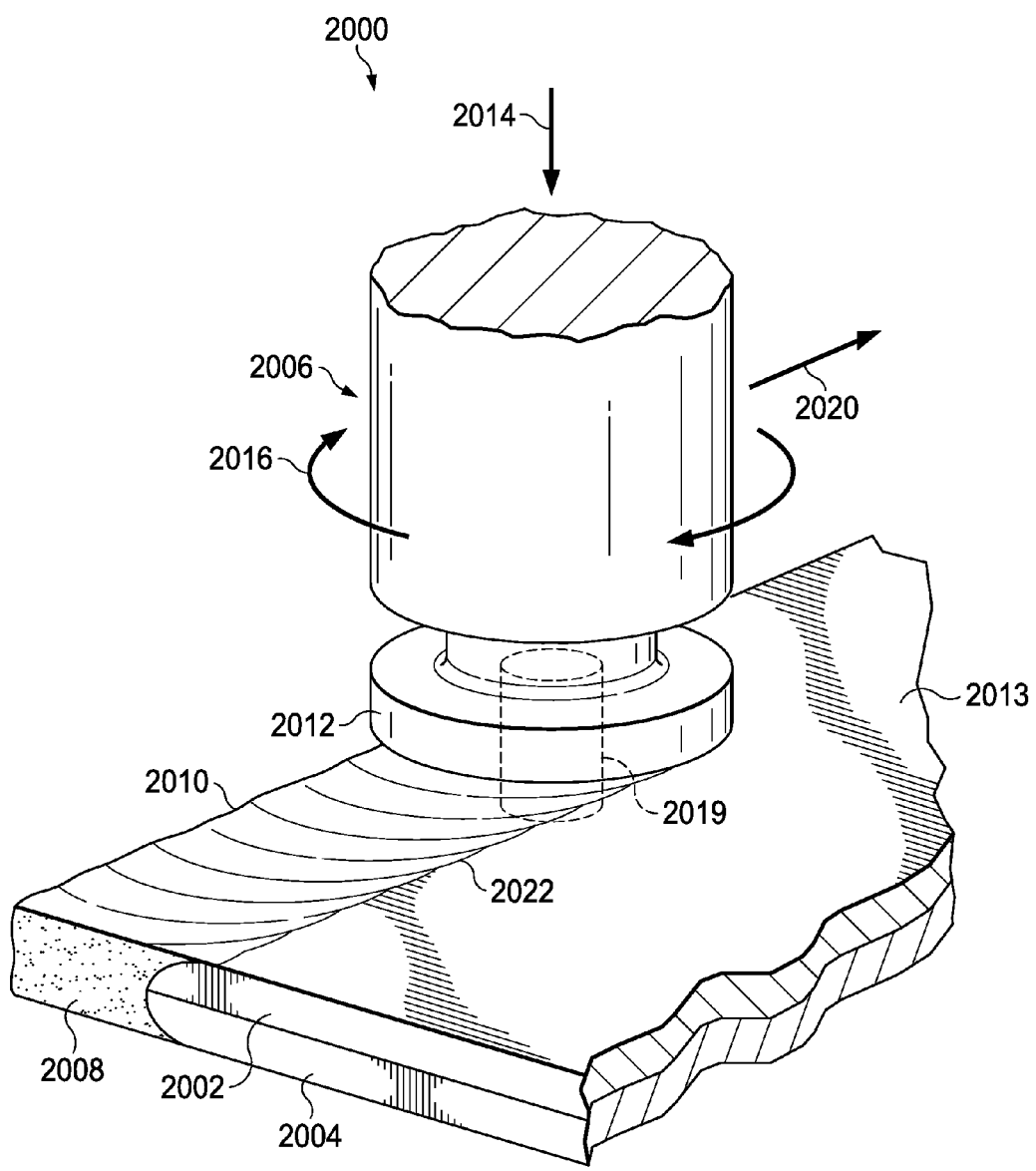
FIG. 20 is an illustration of a friction stir welding apparatus welding two metallic sheets in accordance with an illustrative embodiment.

Turning now to FIG. 20, an illustration of a friction stir welding apparatus welding two metallic sheets is depicted in accordance with an illustrative embodiment. Manufacturing environment 2000 includes first metal sheet 2002, second metal sheet 2004, and friction stir welding apparatus 2006. Friction stir welding apparatus 2006 may be used to form metallic bladder 1504 of FIG. 15.

As depicted, first metal sheet 2002 and second metal sheet 2004 are being welded to each other using friction stir welding apparatus 2006. As can be seen, weld 2008 goes through the thickness of both first metal sheet 2002 and second metal sheet 2004 along edge 2010.

Shoulder 2012 of friction stir welding apparatus contacts top 2013 of first metal sheet 2002. To form weld 2008, friction stir welding apparatus 2006 applies pressure in downward position 2014 while pin 2019 rotates in direction 2016.

As depicted, pin 2019 extends through first metal sheet 2002 and second metal sheet 2004. As pin 2019 rotates, portions of first metal sheet 2002 and second metal sheet 2004 surrounding pin 2019 may be plasticized. Pin 2019 is shown in outline form only. Friction stir welding apparatus 2006 moves in direction 2020 along edge 2010 to form weld 2008 along edge 2010. As depicted, friction stir welding apparatus 2006 leaves trailing edge 2022 of weld 2008 as it moves in direction 2020.

Figure 21:
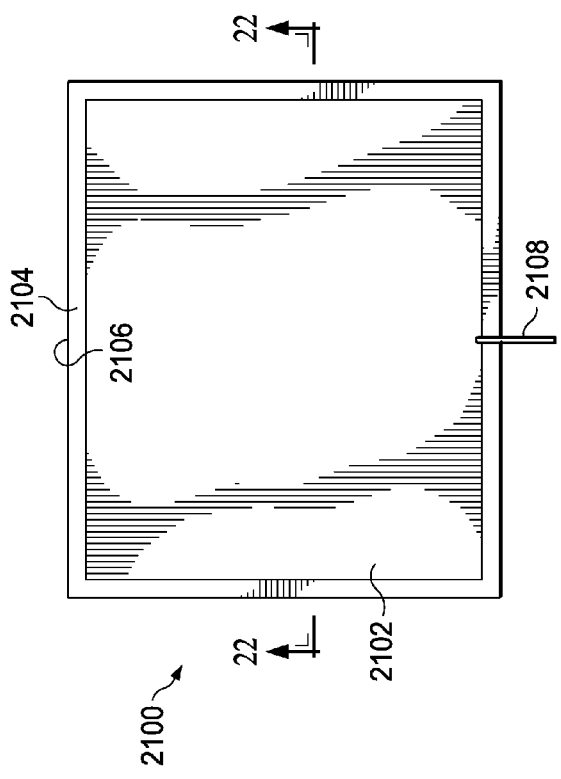
FIG. 21 is an illustration of a top view of a metallic bladder formed using a friction stir welding apparatus in accordance with an illustrative embodiment.

Turning now to FIG. 21, an illustration of a top view of a metallic bladder formed using a friction stir welding apparatus is depicted in accordance with an illustrative embodiment. Metallic bladder 2100 may be metallic bladder 1504 of FIG. 15. Metallic bladder 2100 has first metal sheet 2102 a second metal sheet beneath first metal sheet 2102, and weld 2104 connecting first metal sheet 2102 and the second metal sheet. In this example, weld 2104 travels around the entirety of edge 2106 of metallic bladder 2100.

Input 2108 is attached to the interior of metallic bladder 2100. Input 2108 provides pressurization to metallic bladder 2100.

Figure 22:
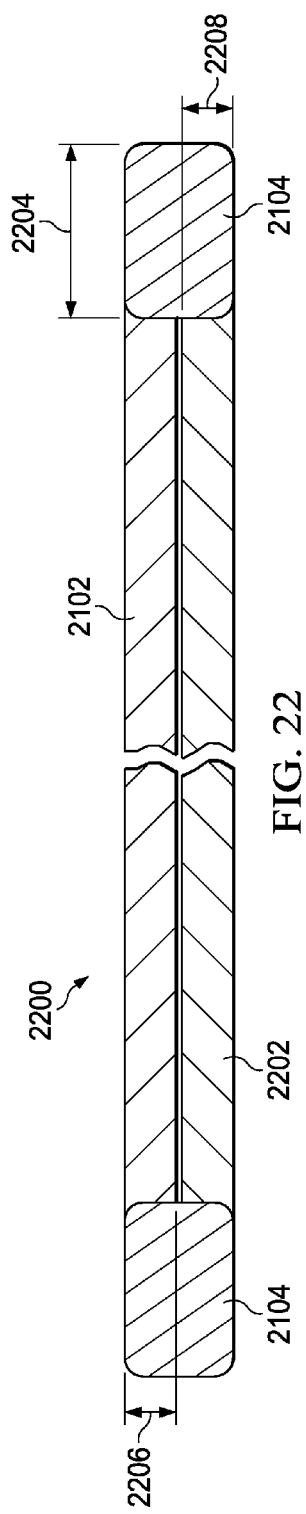
FIG. 22 is an illustration of a cross section of a metallic bladder formed using a friction stir welding apparatus in accordance with an illustrative embodiment.

Turning now to FIG. 22, an illustration of a cross section of a metallic bladder formed using a friction stir welding apparatus is depicted in accordance with an illustrative embodiment. View 2200 may be a cross-sectional view of metallic bladder 2100 along lines 22-22.

As can be seen from view 2200, first metal sheet 2102 may be positioned over second metal sheet 2202. First metal sheet 2102 and second metal sheet 2202 are joined by weld 2104. Weld 2104 extends through thickness 2206 of first metal sheet 2102 and thickness 2208 of second metal sheet 2202.

Thickness 2206 may be between 0.040" and 0.100" thick to reduce or eliminate rounding of features of thermoplastic material during consolidation. Thickness 2208 may be between 0.040" and 0.100" thick to reduce or eliminate rounding of features of thermoplastic material during consolidation.

Weld 2104 may be formed of the material of first metal sheet 2102 and second metal sheet 2202 along edge 2106. This material of first metal sheet 2102 and second metal sheet 2202 along edge 2106 may have been plasticized during a friction stir welding operation using friction stir welding apparatus 2006.

Weld 2104 may provide metallic bladder 2100 with better longevity than traditional thin sheet metal gauges. Weld 2104 may increase the longevity of metallic bladder 2100 by reducing the chances of pressure leaks or ruptures. Weld 2104 may have a thicker width 2204 than traditional thin sheet metal gauges. The thicker width 2204 of weld 2104 may decrease leakage of metallic bladder 2100. Further, thicker width 2204 may resist higher forces generated by greater gas pressures, allowing metallic bladder to be pressurized to higher levels.

Weld 2104 may extend through the thickness of both first metal sheet 2102 and second metal sheet 2202. Extending through the thickness of both first metal sheet 2102 and second metal sheet 2202 may also increase longevity of metallic bladder 2100.

Figure 23:
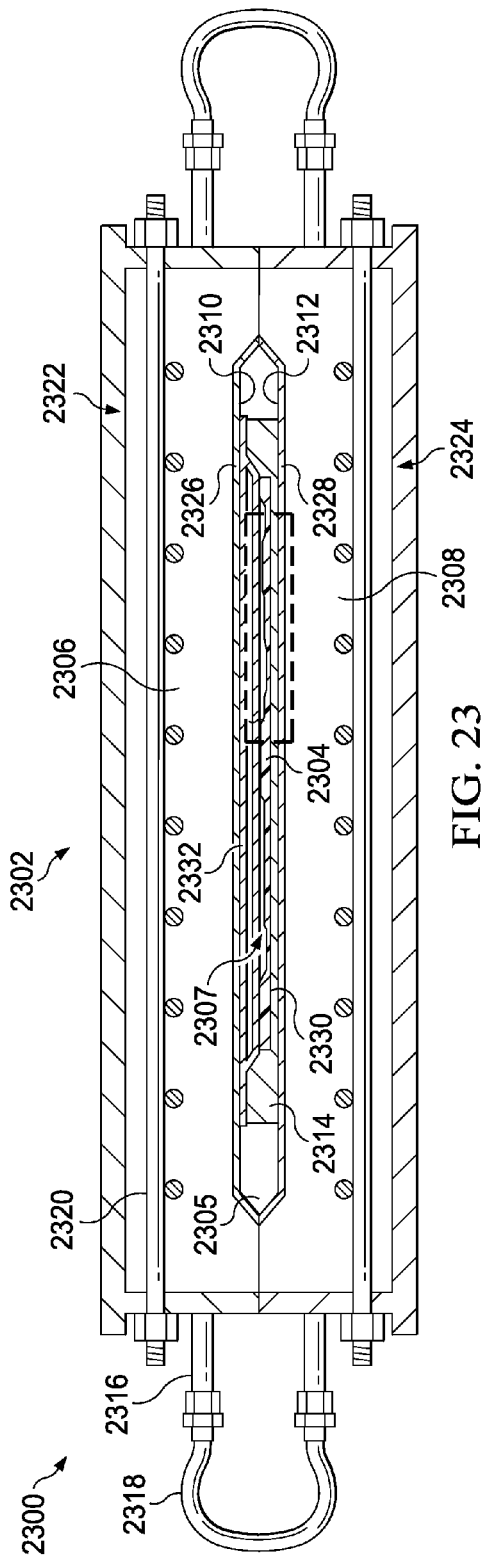
FIG. 23 is an illustration of a cross-sectional view of a metallic bladder, spacer, and thermoplastic material within a tool in accordance with an illustrative embodiment.

Turning now to FIG. 23, an illustration of a cross-sectional view of a metallic bladder, a spacer, and a thermoplastic material within a tool is depicted in accordance with an illustrative embodiment. View 2300 may be a cross-sectional view of a structure within tool 300 of FIG. 3. Specifically, view 2300 may be a cross-sectional view of a structure within tool 300 of FIG. 3 along lines 4-4. Tool 2302 may be a physical implementation of tool 202 in FIG. 2. Structure 2304 may be a physical implementation of structure 206 in FIG. 2.

As depicted, structure 2304 is positioned within tool 2302. Specifically, structure 2304 may be positioned between first die 2306 and second die 2308 within die cavity 2305 of tool 2302. More specifically, structure 2304 may be positioned on spacer 2314.

First die 2306 has internal surface 2310, which may be substantially flat. Second die 2308 has internal surface 2312, which may be substantially flat.

Spacer 2314 may be placed inside die cavity 2305. Spacer 2314 may be configured to consolidate structure 2304. Spacer 2314 may have features 2307 substantially similar to features of structure 2304. As internal surface 2310 and internal surface 2312 are substantially flat, die cavity 2305 may be referred to as "generic." Different shaped structures may be consolidated in die cavity 2305 by exchanging spacer 2314.

As an example, spacer 2314 may be exchanged to provide for a spacer to form a C-channel stiffener. In another example, spacer 2314 may be exchanged to provide for a spacer to form a complex contoured skin panel.

Spacer 2314 may be formed of a material having desirable properties. The desirable properties may be selected from at least one of non-ferromagnetic properties, machinability, rigidity, coefficient of thermal expansion, thermal conductivity, or other desirable properties. Specifically, spacer 2314 may be formed of a metal, or other desirable material. In some illustrative examples, spacer 2314 may be aluminum. In some illustrative examples, material for spacer 2314 may be selected to provide heat transfer to structure 2304.

Using spacer 2314 with features 2307 to consolidate structure 2304 may be desirable as both metallic bladder 2332 and spacer 2314 may be compliant during consolidation of structure 2304. For example, metallic bladder 2332 and spacer 2314 may be compliant at the consolidation temperature of structure 2304. Providing metallic bladder 2332 and spacer 2314 which may be compliant at the consolidation temperature of structure 2304, may reduce rounding of features on both faces of structure 2304.

Using spacer 2314 with features 2307 to consolidate, structure 2304 may have a lower cost than using first die 2306 or a second die 2308 with substantially similar features. Forming features 2307 in first die 2306 or second die 2308 may have considerable cost as plurality induction coils 2316 and plurality of rods 2320 run through first die 2306 and second die 2308. Forming spacer 2314 may cost less than forming first die 2306 or second die 2308.

Plurality of induction coils 2316 runs through first die 2306 and second die 2308. Plurality of induction coils 2316 are joined by flexible sections 2318. Plurality of rods 2320 runs through first die 2306. Plurality of rods 2320 runs through second die 2308. First die 2306 and second die 2308 are held within load constraint 2322 and load constraint 2324.

Die liner 2326 may be associated with first die 2306 within die cavity 2305. Die liner 2328 may be associated with second die 2308 in die cavity 2305. Die liner 2326 and die liner 2328 contact structure 2304 within die cavity 2305.

Structure 2304 comprises thermoplastic material 2330. Thermoplastic material 2330 may be formed using one or more composite layup processes. The one or more composite layup processes may be selected from at least one of braiding, tape layup, tow layup, or any other desirable composite layup process.

In some illustrative examples, thermoplastic material 2330 may be placed on metallic bladder 2332. In some illustrative examples, thermoplastic material 2330 may be placed on spacer 2314.

In some illustrative examples, thermoplastic material 2330 may be placed on metallic bladder 2332 or spacer 2314 through a tape layup process. In one illustrative example, the tape layup process may lay composite material directly onto metallic bladder 2332 or spacer 2314.

In some illustrative examples, the composite layup process may be a laser assisted fiber placement process. In these illustrative examples, thermoplastic composite material may be laid down using laser assisted fiber placement equipment such as laser assisted fiber placement equipment 258 of FIG. 2. Laser assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other.

In some illustrative examples, thermoplastic material 2330 may be placed on metallic bladder 2332 or spacer 2314 as a preform. In this illustrative example, thermoplastic material 2330 may be formed to a desired shape prior to being placed on metallic bladder 2332 or spacer 2314. In some illustrative examples, thermoplastic material 2330 may be consolidated or semi rigid as thermoplastic material 2330 may be placed on metallic bladder 2332 or spacer 2314. In some illustrative examples, the preform may be created using laser assisted fiber placement equipment. In other illustrative examples, thermoplastic material 2330 may be placed on the metallic bladder 2332 or spacer 2314 by a hand layup process.

To consolidate structure 2304, power may be supplied to plurality of induction coils 2316 to produce a magnetic field. In response to the magnetic field, die liner 2326 and die liner 2328 may generate heat.

To consolidate structure 2304, metallic bladder 2332 may be pressurized. Metallic bladder 2332 may be positioned between structure 2304 and die liner 2326 within die cavity 2305 such that metallic bladder 2332 contacts thermoplastic material 2330 of structure 2304. When pressurized, metallic bladder 2332 may impart a compressive force to structure 2304. Metallic bladder 2332 and spacer 2314 define an outer mold line for structure 2304. When metallic bladder 2332 is pressurized, first die 2306 provides resistant structure to metallic bladder 2332. When metallic bladder 2332 is pressurized, second die 2308 provides resistant pressure to spacer 2314.

As structure 2304 is heated and compressed, thermoplastic material 2330 may be consolidated. During heating and compression, resin of thermoplastic material 2330 flows and solidifies.

The illustration of FIG. 23 is not meant to imply physical or architectural limitations to the manner in which an illustrative embodiment may be implemented. Other components in addition to or in place of the ones illustrated may be used. Some components may be unnecessary.

Figure 24:
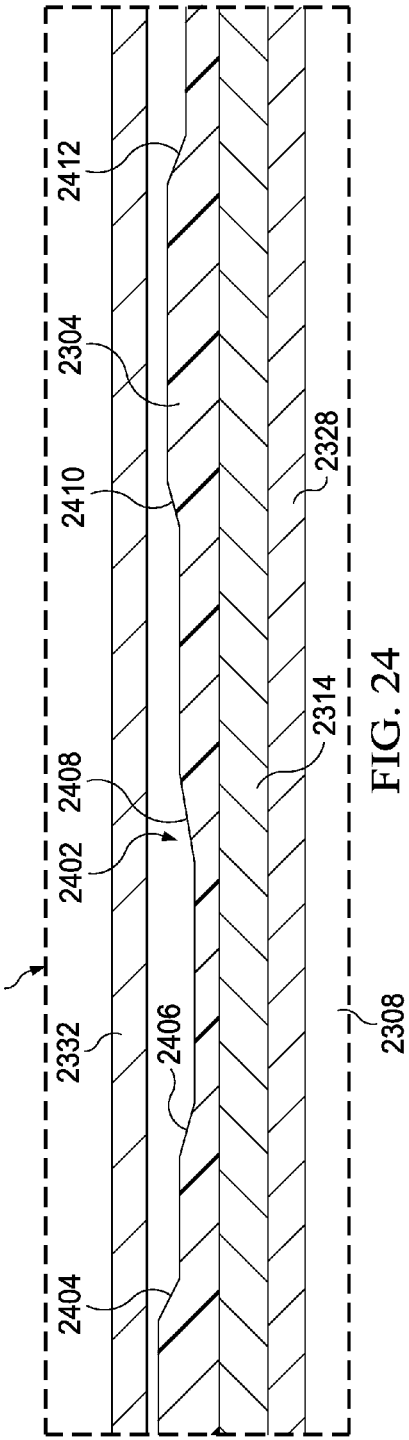
FIG. 24 is an illustration of a cross-sectional view of a portion of an unpressurized metallic bladder, spacer, and thermoplastic material within a tool in accordance with an illustrative embodiment.

Turning now to FIG. 24, an illustration of a cross-sectional view of a portion of an unpressurized metallic bladder, spacer, and thermoplastic material within a tool is depicted in accordance with an illustrative embodiment. Specifically, view 2400 is a cross-sectional view of the portion of metallic bladder 2332, structure 2304, and spacer 2314 of FIG. 23 within the box marked 2400. As can be seen from view 2400, structure 2304 has number of features 2402 which vary the thermoplastic material thickness. As depicted, number of features 2402 includes ramp down 2404, ramp down 2406, ramp up 2408, ramp up 2410, and ramp down 2412. Number of features 2402 may be formed by varying thicknesses of plies of thermoplastic material 2330. Number of features 2402 may be formed by additions of plies of thermoplastic material 2330.

As depicted, metallic bladder 2332 is not yet pressurized. To consolidate thermoplastic material 2330 with number of features 2402, metallic bladder 2332 will be pressurized. To reduce the likelihood of rounding number of features, consolidation of thermoplastic material 2330 may be performed using a consolidation cycle such as consolidation cycle 1900 of FIG. 19 or consolidation cycle 1800 of FIG. 18. Metallic bladder 2332 may be heated to a desired temperature prior to pressurizing metallic bladder 2332. In some illustrative examples, FIG. 24 may take place at ambient temperature. In some illustrative examples, FIG. 24 may take place at a temperature higher than ambient temperature. In some examples, FIG. 24 may take place at a temperature lower than first temperature 1816 of FIG. 18.

Figure 25:
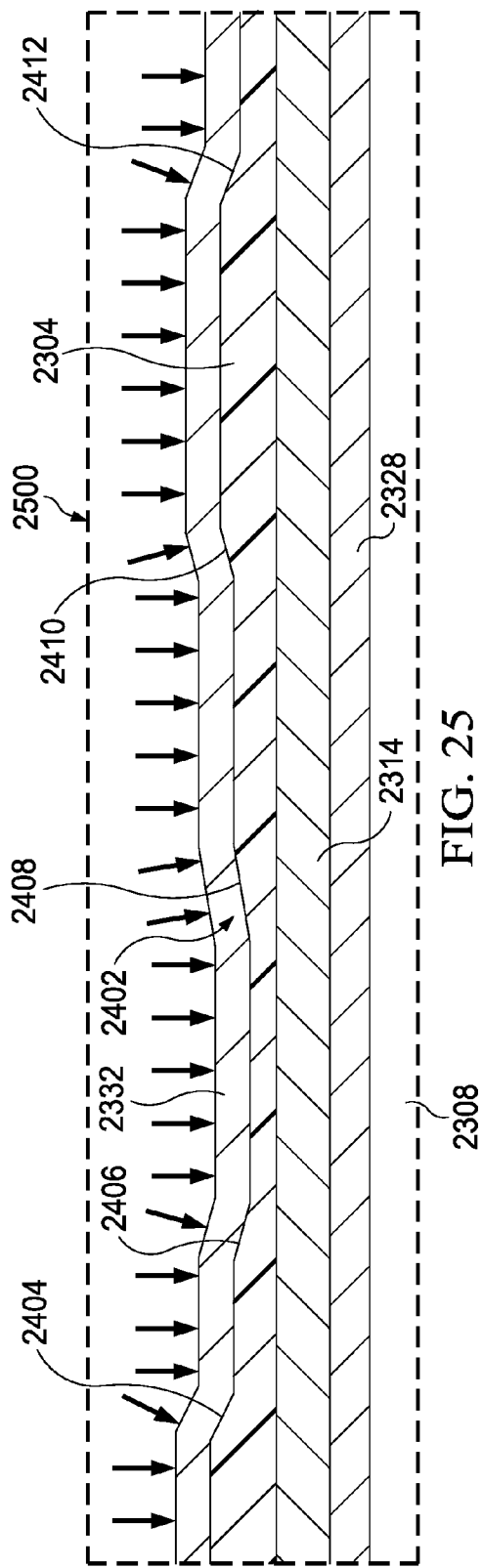
FIG. 25 is an illustration of a cross-sectional view of a portion of a pressurized metallic bladder, spacer, and thermoplastic material within a tool in accordance with an illustrative embodiment.

Turning now to FIG. 25, an illustration of a cross-sectional view of a portion of a pressurized metallic bladder, spacer, and thermoplastic material within a tool is depicted in accordance with an illustrative embodiment. Specifically, view 2500 is a cross-sectional view of the portion of metallic bladder 2332, structure 2304, and spacer 2314 of FIG. 23.

As can be seen from view 2500, metallic bladder 2332 is pressurized. Metallic bladder 2332 is substantially formed to structure 2304. Metallic bladder 2332 is substantially formed to number of features 2402 of structure 2304 which varies the thermoplastic material thickness.

To consolidate thermoplastic material 2330 with number of features 2402, metallic bladder 2332 may be pressurized at an elevated temperature. To reduce the likelihood of rounding number of features, consolidation of thermoplastic material 2330 may be performed using a consolidation cycle such as consolidation cycle 1900 of FIG. 19 or consolidation cycle 1800 of FIG. 18. Metallic bladder 2332 may be heated to a desired temperature prior to pressurizing metallic bladder 2332.

In some illustrative examples, FIG. 25 may take place at a temperature higher than ambient temperature. In some illustrative examples, FIG. 25 may take place at a temperature at or above first temperature 1816 of FIG. 18. In some examples, FIG. 25 may take place at a temperature near a melting temperature of thermoplastic material 2330. For example, FIG. 25 may take place within 50 degrees above or below the melting temperature of thermoplastic material 2330.

Figure 26:
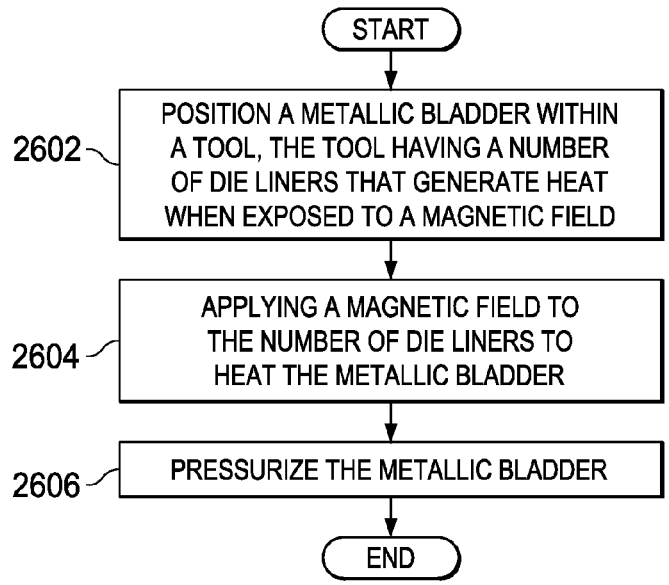
FIG. 26 is an illustration of a flowchart of a process for forming a metallic bladder in accordance with an illustrative embodiment.

Turning now to FIG. 26, an illustration of a flowchart of a process for forming a metallic bladder is depicted in accordance with an illustrative embodiment. The process may begin by positioning a metallic bladder 1504 within a tool 1502, the tool 1502 having a number of die liners 1526, 1528 that generate heat when exposed to a magnetic field (operation 2602). The metallic bladder may have an initial shape prior to being placed into the tool.

In some illustrative examples, a thermoplastic material may be placed over the metallic bladder prior to positioning the metallic bladder within the tool. This thermoplastic material may be a sacrificial layer. This thermoplastic material takes up space within a die cavity of the tool which will be taken up by a structure to be consolidated. This thermoplastic material may also be referred to as a mock part.

In some illustrative examples, a thermoplastic material may be placed within the tool prior to placing the metallic bladder into the tool. The thermoplastic material may take up the space within a die cavity of the tool which will be taken up by a structure to be consolidated. This thermoplastic material may also be referred to as a mock part.

In some illustrative examples, a number of placeholders may be positioned within the tool. In these illustrative examples, the number of placeholders may be formed of a metal, a ceramic, or other desirable material. A desirable material may provide minimal resistance to the expansion of the metallic bladder. In some illustrative examples, the number of placeholders may be aluminum. In another illustrative example, the number of mock parts may be magnesium. In yet another illustrative example, the number of placeholders may be a composite. The number of placeholders may generally take up space within a die cavity of the tool which will be taken up by a structure to be consolidated. The number of placeholders may be substantially the same size and shape as a structure to be consolidated.

The method may apply a magnetic field to the number of die liners 1526, 1528 to heat the metallic bladder 1504 (operation 2604). In response to the magnetic field, the number of die liners may generate heat. The material forming the metallic bladder may be softened by the heat generated by the number of die liners.

The method may then pressurize the metallic bladder 1504 (operation 2606). Afterwards the process terminates.

By pressurizing the metallic bladder, the metallic bladder expands. When the metallic bladder expands, the softened metal of the metallic bladder may change shape. The metallic bladder may change from the initial shape to a first shape.

In some illustrative examples, pressurizing the metallic bladder comprises pressurizing the metallic bladder to about 250 psi. In some illustrative examples, pressurizing the metallic bladder comprises pressurizing the metallic bladder to a pressure sufficient to form the bladder to a surface at least one of a placeholder and a thermoplastic material within the tool. In some illustrative examples, pressurizing the metallic bladder forms the metallic bladder against mock parts within the tool. In some illustrative examples, the method may friction stir weld edges of a number of metallic sheets to form the metallic bladder prior to placing the metallic bladder into the tool.

Figure 27:
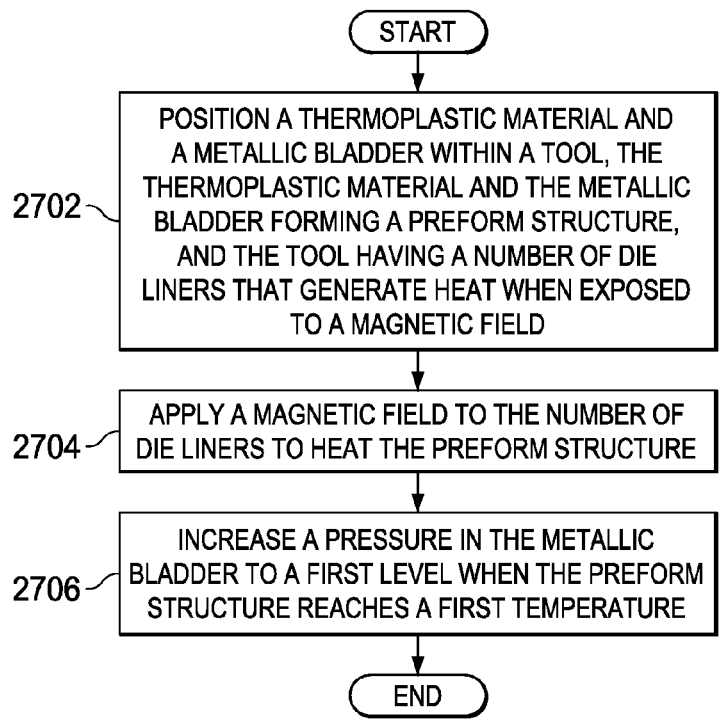
FIG. 27 is an illustration of a flowchart of a process for forming a consolidated structure in accordance with an illustrative embodiment.

Turning now to FIG. 27, an illustration of a flowchart of a process for forming a consolidated structure is depicted in accordance with an illustrative embodiment. The method may begin by positioning thermoplastic material 2330 and metallic bladder 2332 within tool 2302, thermoplastic material 2330 and metallic bladder 2332 forming a preform structure, and tool 2302 having number of die liners 2326 and 2328 that generate heat when exposed to a magnetic field (operation 2702). In some illustrative examples, the thermoplastic material may be placed on the metallic bladder prior to positioning the thermoplastic material and the metallic bladder within the tool. In some illustrative examples, the thermoplastic material may be a braided thermoplastic material. In some illustrative examples, the thermoplastic material may be placed on a spacer prior to placing the thermoplastic material into the tool.

The method may then apply a magnetic field to the number of die liners to heat the preform structure (operation 2704). In some illustrative examples, the number of die liners may be referred to as a number of smart susceptors. The number of die liners may be configured to heat the preform structure to a temperature above the melting temperature of the thermoplastic material.

The method may then increase a pressure in the metallic bladder to a first level when the preform structure reaches a first temperature (operation 2706). Afterwards the process terminates.

In some illustrative examples, the first level of the pressure is from about 100 psi to about 200 psi. In some illustrative examples, the first level of the pressure is sufficient to result in a consolidated structure with substantially no porosity. In some illustrative examples, the first level of the pressure is sufficient to consolidate the preform structure.

The first temperature may be a temperature below the melting temperature of the thermoplastic material. The first temperature may be a temperature within about 50 degrees of the melting temperature of the thermoplastic material.

There may be further steps performed following termination of the method. In some illustrative examples, the preform structure may be held at the first temperature for a first period of time, and the preform structure may then be heated from the first temperature to a second temperature. In some illustrative examples, the second temperature is above a melting temperature of resin of the thermoplastic material.

In some illustrative examples, the pressure within the metallic bladder may be reduced from the first level to a second level after holding the preform structure at the first temperature for a first period of time. The second level of pressure may be about 50 psi. The second level of pressure may be a lower pressure than the first level of pressure and the second level may be sufficient to maintain full contact between the metallic bladder and the thermoplastic material. In other illustrative examples, the pressure within the metallic bladder may be held at the first level after holding the preform structure at the first temperature for a first period of time.

In some illustrative examples, the preform structure may be held at the second temperature for a second period of time, and the preform structure may be cooled at a controlled rate from the second temperature to ambient temperature to form the consolidated structure. In some illustrative examples, the pressure may be increased within the metallic bladder from the second level to the first level after heating the preform structure from a first temperature to the second temperature, and the pressure within the metallic bladder may be maintained at the first level during the second period of time. In some illustrative examples, the pressure within the metallic bladder may be reduced from the first level to the second level when the preform structure is at a third temperature during cooling of the preform structure at the controlled rate from the second temperature to ambient temperature. In some illustrative examples, the pressure within the metallic bladder may be released such that the metallic bladder decreases from the second level to the ambient level when the preform structure reaches a glass transition temperature of the thermoplastic material during cooling of the preform structure at the controlled rate from the second temperature to ambient temperature.

In some illustrative examples, the process further comprises friction stir welding edges of two metallic sheets to form the metallic bladder. The friction stir welding may occur prior to placing the metallic bladder within the tool.

The illustrative embodiments provide a method and apparatus for forming a metallic bladder. The illustrative embodiments also provide a method and apparatus for forming a thermoplastic structure using a consolidation cycle. Specifically, the illustrative embodiments provide a method and apparatus for forming a metallic bladder using inductive heating.

The metallic bladder may be formed at a temperature at or above the consolidation temperature of a thermoplastic material. The metallic bladder may be formed at a pressure higher than a consolidation pressure of a thermoplastic material. The metallic bladder may be formed using inductive tooling including die liner 1526 and die liner 1528. Die liner 1526 and die liner 1528 may later be used to consolidate a thermoplastic material.

The metallic bladder may be created by friction stir welding two metallic sheets. Friction stir welding may create a weld of sufficient thickness to maintain pressure within the metallic bladder. Friction stir welding may create a metallic bladder which may contain higher pressures without leaks.

Thermoplastic material may be consolidated using a consolidation cycle. The consolidation cycle may have a first temperature hold and a second temperature hold. The first temperature hold may have a temperature below the melting temperature of the thermoplastic material. The metallic bladder is pressurized at the first temperature to apply pressure to the thermoplastic when the thermoplastic is a soft solid. The metallic bladder may be formed to the features of the thermoplastic material including ramp ups, ramp downs, and other features when the thermoplastic is a soft solid. The thermoplastic material may be debulked by the application of pressure by the bladder.

The temperature may be increased to a second temperature to melt the resin of the thermoplastic material. Pressure applied to the thermoplastic material at the second temperature may consolidate the thermoplastic material.

By forming thermoplastic structures according to the illustrative embodiments, features may be maintained without substantial rounding in the thermoplastic material. By forming metallic bladders according to the illustrative embodiments, the metallic bladders may consolidate thermoplastic material without substantially rounding features of the thermoplastic material. Further, by forming metallic bladders according to the illustrative embodiments, metallic bladders may have greater durability. By forming metallic bladders according to the illustrative embodiments, metallic bladders may hold greater pressures. By forming thermoplastic structures according to one or more illustrative embodiments, quality of the thermoplastic structures may be increased. Additionally, the illustrative embodiments may create thermoplastic structures with ply drops.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a consolidated structure comprising:
    positioning a thermoplastic material and a metallic bladder within a tool, the thermoplastic material and the metallic bladder forming a preform structure, and the tool having a number of die liners that generate heat when exposed to a magnetic field;
    applying the magnetic field to the number of die liners to heat the preform structure;
    increasing a pressure in the metallic bladder to a first level when the preform structure reaches a first temperature;
    holding the preform structure at the first temperature for a first period of time;
    reducing the pressure within the metallic bladder from the first level to a second level after holding the preform structure at the first temperature for the first period of time;
    heating the preform structure from the first temperature to a second temperature;
    increasing the pressure within the metallic bladder from the second level to the first level after heating the preform structure from the first temperature to the second temperature;
    holding the preform structure at the second temperature for a second period of time;
    maintaining the pressure within the metallic bladder at the first level during the second period of time;
    cooling the preform structure at a controlled rate from the second temperature to ambient temperature to form the consolidated structure; and
    reducing the pressure within the metallic bladder from the first level to the second level when the preform structure is at a third temperature during cooling the preform structure at the controlled rate from the second temperature to the ambient temperature.

2. The method of claim 1, wherein the first level of the pressure is from about 100 psi to about 200 psi.

3. The method of claim 1, wherein the first level of the pressure is sufficient to result in a consolidated structure with substantially no porosity.

4. The method of claim 1, wherein the first level of the pressure is sufficient to consolidate the preform structure.

5. The method of claim 1 further comprising:
    friction stir welding edges of two metallic sheets to form the metallic bladder.

6. The method of claim 1 further comprising:
    releasing the pressure within the metallic bladder such that the metallic bladder decreases from the second level to ambient level when the preform structure reaches a glass transition temperature of the thermoplastic material during cooling the preform structure at the controlled rate from the second temperature to ambient temperature.

7. The method of claim 1, wherein the first temperature is below a melting temperature of resin of the thermoplastic material.

8. The method of claim 1, wherein the second temperature is above a melting temperature of resin of the thermoplastic material.

9. The method of claim 1, wherein the second level of the pressure is about 50 psi.

10. The method of claim 1, wherein the second level of the pressure is a lower pressure than the first level of the pressure and the second level is sufficient to maintain full contact between the metallic bladder and the thermoplastic material.

11. A method of forming a consolidated structure comprising:
    positioning a thermoplastic material and a metallic bladder within a tool, the thermoplastic material and the metallic bladder forming a preform structure, and the tool having a number of die liners that generate heat when exposed to a magnetic field;
    applying the magnetic field to the number of die liners to heat the preform structure;
    increasing a pressure in the metallic bladder to a first level when the preform structure reaches a first temperature;
    holding the preform structure at the first temperature for a first period of time;
    heating the preform structure from the first temperature to a second temperature;
    holding the preform structure at the second temperature for a second period of time;
    cooling the preform structure at a controlled rate from the second temperature to ambient temperature to form the consolidated structure;
    reducing the pressure within the metallic bladder from the first level to a second level when the preform structure is at a third temperature during cooling the preform structure at the controlled rate from the second temperature to ambient temperature; and
    releasing the pressure within the metallic bladder such that the metallic bladder decreases from the second level to ambient level when the preform structure reaches a glass transition temperature of the thermoplastic material during cooling the preform structure at the controlled rate from the second temperature to ambient temperature.

12. The method of claim 11, wherein the second level of the pressure is a lower pressure than the first level of the pressure and the second level is sufficient to maintain full contact between the metallic bladder and the thermoplastic material.

13. The method of claim 12, wherein the first level of the pressure is from about 100 psi to about 200 psi, and wherein the second level of the pressure is about 50 psi.

14. The method of claim 11 further comprising:
    friction stir welding edges of two metallic sheets to form the metallic bladder.

15. The method of claim 11, wherein the first temperature is below a melting temperature of resin of the thermoplastic material.

16. The method of claim 11, wherein the second temperature is above a melting temperature of resin of the thermoplastic material.

* * * * *